US011817924B1

United States Patent
Sridharan et al.

(10) Patent No.: US 11,817,924 B1
(45) Date of Patent: Nov. 14, 2023

(54) TRANSMISSION PRECODING MATRIX INDICATOR GROUPING AND DESIGNS FOR UPLINK MULTI-LAYER TRANSMISSIONS

(71) Applicant: QUALCOMM Incorporated, San Diego, CA (US)

(72) Inventors: Gokul Sridharan, Sunnyvale, CA (US); Yi Huang, San Diego, CA (US); Hyojin Lee, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/740,297

(22) Filed: May 9, 2022

(51) Int. Cl.
*H04B 7/0456* (2017.01)
*H04W 72/23* (2023.01)

(52) U.S. Cl.
CPC .......... *H04B 7/0456* (2013.01); *H04W 72/23* (2023.01)

(58) Field of Classification Search
CPC .. H04B 7/0639; H04B 7/0456; H04B 7/0486; H04B 7/0404; H04B 7/0628; H04B 7/0868; H04L 5/0053; H04L 1/0026; H04L 25/0204; H04L 25/03; H04L 5/0023; H04L 5/0048; H04L 1/1854; H04L 25/0202; H04L 25/0224; H04W 72/23; H04W 72/21; H04W 72/0446; H04W 72/1268; H04W 52/146; H04W 72/04; H04W 72/20; H04W 72/0453; H04W 24/10
USPC ....................................................... 375/267
See application file for complete search history.

(56) References Cited

U.S. PATENT DOCUMENTS

| | | | |
|---|---|---|---|
| 2018/0183503 A1* | 6/2018 | Rahman | H04W 72/23 |
| 2020/0213053 A1* | 7/2020 | Faxér | H04L 5/0023 |
| 2020/0266867 A1 | 8/2020 | Park et al. | |
| 2020/0267701 A1 | 8/2020 | Park et al. | |

(Continued)

OTHER PUBLICATIONS

3GPP TS 38.306: "3rd Generation Partnership Project, Technical Specification Group Radio Access Network NR, User Equipment (UE) Radio Access Capabilities (Release 15)", 3GPP Draft, DRAFT_TPT038306(F10)_[102#11] [NR]_V0, 3rd Generation Partnership Project (3GPP), Mobile Competence Centre, 650, Route Des Lucioles, F-06921 Sophia-Antipolis Cedex, France, May 31, 2018, V15.1.0, XP051546014, pp. 1-25, p. 14.

(Continued)

*Primary Examiner* — Eva Y Puente
(74) *Attorney, Agent, or Firm* — Holland & Hart LLP

(57) ABSTRACT

Methods, systems, and devices for wireless communications are described. A user equipment (UE) may transmit capability information to the network indicating its coherence capability for transmitting multiple layers on a single antenna port. In some cases, the indicated capability information may actually be less than the actual capability of the UE, but may indicate which transmission precoding matrix indicator (TPMI) indexes are valid, such that the UE is not expected to transmit complex waveforms resulting from too many layers per antenna port. In some examples, the UE may indicate, in the capability information, a threshold number of layers per antenna port it can support. In some examples, the UE may indicate its coherence capability on a per-rank basis. In some examples, the UE may be capable of supporting up to 8 layers per antenna port. In some cases, codebooks may be restricted to support 8 layer transmissions.

30 Claims, 16 Drawing Sheets

(56) References Cited

U.S. PATENT DOCUMENTS

| | | | |
|---|---|---|---|
| 2020/0336998 A1 | 10/2020 | Rahman et al. | |
| 2022/0279492 A1* | 9/2022 | Park | H04W 72/23 |
| 2022/0330282 A1* | 10/2022 | Kim | H04W 72/0446 |
| 2022/0393738 A1* | 12/2022 | Park | H04B 7/0628 |

OTHER PUBLICATIONS

ERICSSON: "Codebook Based UL MIMO Remaining Details", 3GPP Draft, 3GPP TSG-RAN WG1 #91, R1-1720731 UL MIMO for Codebook Based Transmission, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051370188, pp. 1-23, Section 1, Claims 8,9,12,13.
International Search Report and Written Opinion—PCT/US2023/064179—ISA/EPO—dated Jun. 1, 2023 (2203816WO).

* cited by examiner

TRANSMISSION PRECODING MATRIX INDICATOR GROUPING AND DESIGNS FOR UPLINK MULTI-LAYER TRANSMISSIONS

FIELD OF TECHNOLOGY

The following relates to wireless communications, including transmission precoding matrix indicator grouping and designs for uplink multi-layer transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transmission precoding matrix indicator grouping and designs for uplink multi-layer transmissions. A user equipment (UE) may transmit capability information to the network indicating a coherence capability of the UE for transmitting multiple layers on a single antenna port. In some cases, the indicated capability information may be less than the actual capability of the UE, but may indicate which transmission precoding matrix indicator (TPMI) indexes are valid, such that the UE is not expected to transmit complex waveforms resulting from too many layers per antenna port. In some examples, the UE may indicate, in the capability information, a threshold number of layers per antenna port it can support. In some examples, the UE may indicate a coherence capability of the UE on a per-rank basis. In some examples, the UE may be capable of supporting up to 8 layers per antenna port. In some cases, codebooks may be restricted to support 8 layer transmissions. For example, an 8 transmitter codebook may be constructed from two 4 transmitter codebooks, where the first four antenna ports are used to transmit a first subset of layers, and the next set of four antenna ports are used to transmit the remaining layers. In some examples, codebooks may be constrained to ensure that a first subset of antenna ports using a first modulation coding scheme (MCS) (associated with a transport block, or a subset of layers) do not overlap with a second subset of antenna ports.

A method for wireless communications at a user equipment (UE) is described. The method may include transmitting capability information indicating transmission coherence information of the UE, receiving a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and transmitting an uplink message based on the transmission precoding matrix indicator and according to the transmission coherence information.

An apparatus for wireless communications at a UE is described. The apparatus may include a processor, memory coupled with the processor, and instructions stored in the memory. The instructions may be executable by the processor to cause the apparatus to transmit capability information indicating transmission coherence information of the UE, receive a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and transmit an uplink message based on the transmission precoding matrix indicator and according to the transmission coherence information.

Another apparatus for wireless communications at a UE is described. The apparatus may include means for transmitting capability information indicating transmission coherence information of the UE, means for receiving a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and means for transmitting an uplink message based on the transmission precoding matrix indicator and according to the transmission coherence information.

A non-transitory computer-readable medium storing code for wireless communications at a UE is described. The code may include instructions executable by a processor to transmit capability information indicating transmission coherence information of the UE, receive a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and transmit an uplink message based on the transmission precoding matrix indicator and according to the transmission coherence information.

In some examples of the method, apparatuses, and non-transitory computer-readable medium described herein, transmitting the capability information indicating the transmission coherence information may include operations, features, means, or instructions for transmitting, in the capability information, an indication of a threshold number of transmission layers supported by the UE for each antenna port at the UE, where the transmission precoding matrix indicator may be associated with a transmission precoder matrix that satisfies the threshold number of transmission layers per antenna port.

In some examples of the method, apparatuses, and non-transitory computer-readable medium described herein, transmitting the capability information indicating the transmission coherence information may include operations, features, means, or instructions for transmitting an indication of a set of multiple UE coherence values, each UE coherence value of the set of multiple UE coherence values corresponding to a respective transmission rank.

Some examples of the method, apparatuses, and non-transitory computer-readable medium described herein may further include operations, features, means, or instructions for determining, for each of a set of multiple transmission ranks, the capability information including a coherence capability associated with a first coherence type of a set of coherence types, the set of coherence types including a first coherence type indicating that the UE may be not capable of maintaining phase coherence across any of the number of antenna ports, a second coherence type indicating that the UE may be capable of maintaining phase coherence across up to two of the number of antenna ports, and a third coherence type indicating that the UE may be capable of maintaining phase coherence across a total number of antenna ports at the UE.

In some examples of the method, apparatuses, and non-transitory computer-readable medium described herein, transmitting the capability information indicating the transmission coherence information may include operations, features, means, or instructions for transmitting, for each of the set of multiple transmission ranks, an indication of one of the set of coherence types that indicates a coherence type that supports a phase coherence capability that may be less than or equal to the coherence capability.

Some examples of the method, apparatuses, and non-transitory computer-readable medium described herein may further include operations, features, means, or instructions for precoding the uplink message according to a precoding configuration indicated by the transmission precoding matrix indicator, where the precoding configuration includes a first precoder for a first number of antenna ports that may be less than a total number of antenna ports supported by the UE and a second precoder for a second number of antenna ports that may be less than the total number of antenna ports supported by the UE.

In some examples of the method, apparatuses, and non-transitory computer-readable medium described herein, transmitting the uplink message may include operations, features, means, or instructions for transmitting a first transport block of the uplink message according to a first modulation coding scheme and transmitting a second transport block of the uplink message according to a second modulation coding scheme.

In some examples of the method, apparatuses, and non-transitory computer-readable medium described herein, the transmission precoding matrix indicator indicates a precoding codebook in which a first subset of a total number of antenna ports supported by the UE carrying a first set of transmission layers for the first transport block of the uplink message does not overlap with a second subset of the total number of antenna ports supported by the UE carrying a second set of transmission layers for the second transport block of the uplink message.

In some examples of the method, apparatuses, and non-transitory computer-readable medium described herein, the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

A method for wireless communications at a network entity is described. The method may include obtaining capability information indicating transmission coherence information of the UE, outputting a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and obtaining an uplink message based on the transmission precoding matrix indicator and according to the transmission coherence information.

An apparatus for wireless communications at a network entity is described. The apparatus may include a processor, memory coupled with the processor, and instructions stored in the memory. The instructions may be executable by the processor to cause the apparatus to obtain capability information indicating transmission coherence information of the UE, output a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and obtain an uplink message based on the transmission precoding matrix indicator and according to the transmission coherence information.

Another apparatus for wireless communications at a network entity is described. The apparatus may include means for obtaining capability information indicating transmission coherence information of the UE, means for outputting a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and means for obtaining an uplink message based on the transmission precoding matrix indicator and according to the transmission coherence information.

A non-transitory computer-readable medium storing code for wireless communications at a network entity is described. The code may include instructions executable by a processor to obtain capability information indicating transmission coherence information of the UE, output a downlink control information message including an index value associated with a transmission precoding matrix indicator of the set of multiple transmission precoding matrix indicators, where each transmission precoding matrix indicator of the set of multiple transmission precoding matrix indicators associated with a number of antenna ports and a number of transmission layers per antenna port at the UE, the transmission precoding matrix indicator satisfying the transmission coherence information, and obtain an uplink message based on the transmission precoding matrix indicator and according to the transmission coherence information.

In some examples of the method, apparatuses, and non-transitory computer-readable medium described herein, obtaining the capability information indicating the transmission coherence information may include operations, features, means, or instructions for obtaining, in the capability information, an indication of a threshold number of transmission layers supported by the UE for each antenna port at the UE, where the transmission precoding matrix indicator may be associated with a transmission precoder matrix that satisfies the threshold number of transmission layers per antenna port.

In some examples of the method, apparatuses, and non-transitory computer-readable medium described herein, obtaining the capability information indicating the transmission coherence information may include operations, features, means, or instructions for obtaining an indication of a set of multiple UE coherence values, each UE coherence value of the set of multiple UE coherence values corresponding to a respective transmission rank.

In some examples of the method, apparatuses, and non-transitory computer-readable medium described herein, obtaining the capability information indicating the transmission coherence information may include operations, features, means, or instructions for obtaining the uplink message according to a precoding configuration indicated by the transmission precoding matrix indicator, where the precoding configuration includes a first precoder for a first number of antenna ports that may be less than a total number of antenna ports supported by the UE and a second precoder for a second number of antenna ports that may be less than the total number of antenna ports supported by the UE.

Some examples of the method, apparatuses, and non-transitory computer-readable medium described herein may further include operations, features, means, or instructions for obtaining a first transport block of the uplink message according to a first modulation coding scheme and a second transport block of the uplink message according to a second modulation coding scheme.

In some examples of the method, apparatuses, and non-transitory computer-readable medium described herein, the transmission precoding matrix indicator indicates a precoding codebook in which a first subset of a total number of antenna ports supported by the UE carrying a first set of transmission layers for the first transport block of the uplink message does not overlap with a second subset of the total number of antenna ports supported by the UE carrying a second set of transmission layers.

In some examples of the method, apparatuses, and non-transitory computer-readable medium described herein, the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

DETAILED DESCRIPTION

Figure 1:
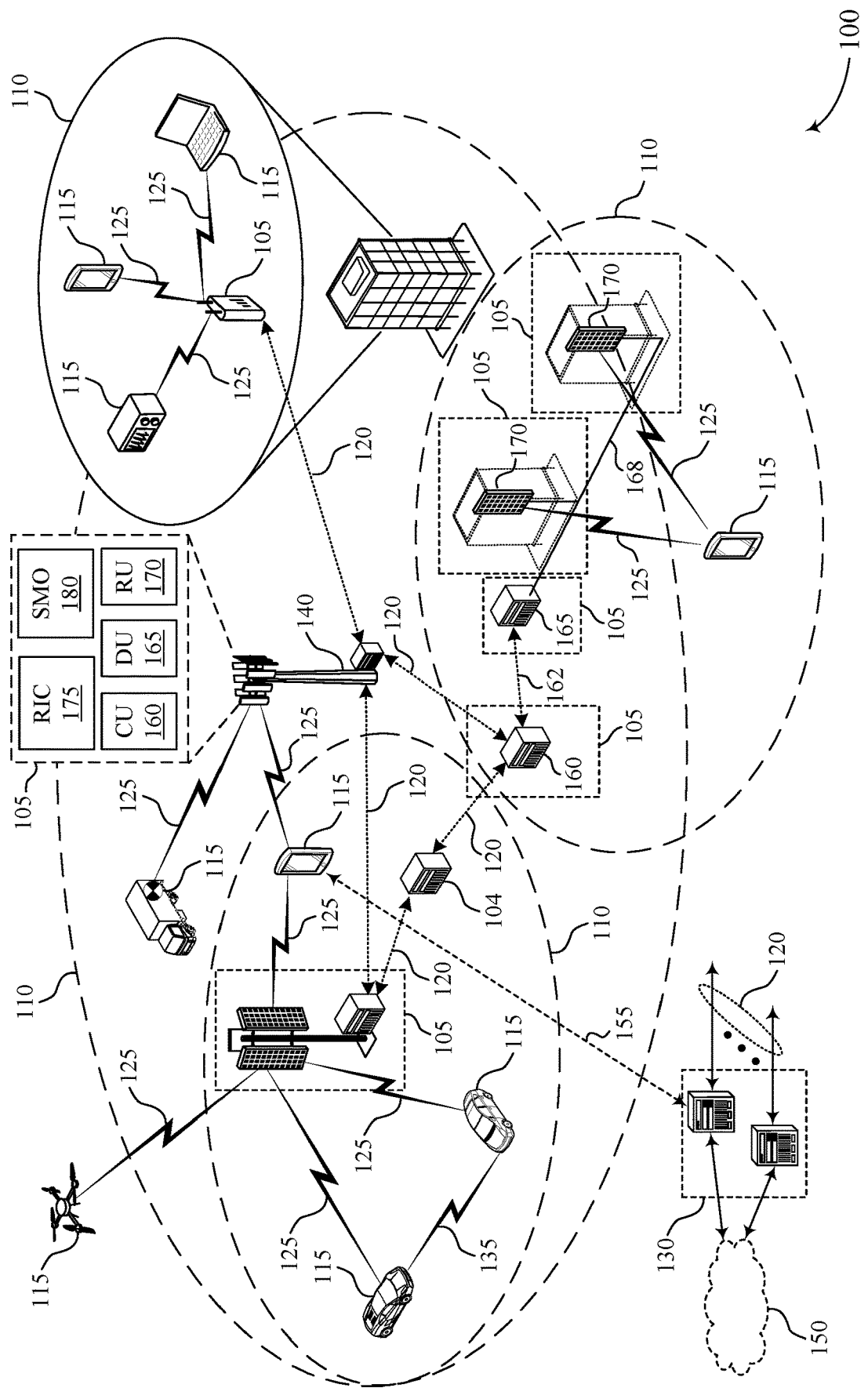
FIG. 1 illustrates an example of a wireless communications system that supports transmission precoding matrix indicator grouping and designs for uplink multi-layer transmissions in accordance with one or more aspects of the present disclosure.

Some wireless communications systems (e.g., 5G-new radio (NR) systems) may define multiple precoder codebooks to use for multi-layer codebook-based physical uplink shared channel (PUSCH) transmissions. The network may indicate, to a user equipment (UE), one or more precoding codebooks to use for uplink transmissions (e.g., via a transmission precoding matrix indicator (TPMI) index). Codebooks may be dependent on a number of transmission antenna ports at the UE, and the ability of the UE to maintain phase coherence across antenna ports. In some wireless communications systems, some precoder codebooks may have precoding matrices for which a UE may transmit multiple layers using a single antenna port. However, such transmissions may result in additional complexity at the UE. For example, such transmissions may result in transmission of waveforms according to a 25 quadrature amplitude modulation (QAM) constellation, or 9 QAM constellation, or another unconventional waveform. Additionally, transmissions in many wireless communications systems may be subject to constraints such as error vector magnitude (EVM), adjacent channel leakage power ratio (ACLR), in-band emissions (IBE), and spectrum emissions mask (SEM), among other examples. However, such constraints may not be well developed or available to the UE for the unique waveforms generated by transmitting multiple layers via a single antenna port. Thus, even if a UE is capable of maintaining phase coherence for multiple transmission layers via a single antenna port, such transmissions may fail, or may lead to increased use of computational resources, lack of support by a receiving device, etc., which may result in increased system latency, inefficient use of available wireless resources, and poor user experience.

A UE may transmit capability information to the network indicating a coherence capability of the UE for transmitting multiple layers on a single antenna port. In some cases, the indicated capability information may be less than the actual capability of the UE, but may indicate which transmission precoding matrix indicator (TPMI) indexes are valid, such that the UE is not expected to transmit complex waveforms resulting from too many layers per antenna port. For example, a UE may be non-coherent (e.g., unable to maintain phase continuity across antenna ports), may be partially coherent (e.g., able to maintain phase continuity across two antenna ports), or fully coherent (e.g., capable of maintaining phase continuity across all antenna port). In some examples, the UE may indicate, in the capability information, a maximum number of layers per antenna port it can support. For instance, a partially coherent UE may indicate no more than 1 layer per antenna port. In such examples, the network may only indicate TPMIs that satisfy this capability (e.g., the UE will not be expected to transmit multiple layers via a single antenna port). In some examples, the UE may indicate its coherence capability on a per-rank basis. In such examples, the UE may indicate that it is fully coherent for rank 1, but partially coherent for rank 2, and/or partially coherent or non-coherent for rank 3, etc.

In some examples, the UE may be capable of supporting up to 8 layers per antenna port. In some cases, codebooks may be restricted to support 8 layer transmissions. For example, an 8 transmitter codebook may be constructed from two 4 transmitter codebooks, where the first four antenna ports are used to transmit a first subset of layers, and the next set of four antenna ports are used to transmit the remaining layers. In some examples, codebooks may be constrained to ensure that a first subset of antenna ports using a first modulation coding scheme (MCS) (associated with a transport block, or a subset of layers) do not overlap with a second subset of antenna port s.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to transmission precoding matrix indicator grouping and designs for uplink multi-layer transmissions.

FIG. 1 illustrates an example of a wireless communications system 100 that supports transmission precoding matrix indicator grouping and designs for uplink multi-layer transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support transmission precoding matrix indicator grouping and designs for uplink multi-layer transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may transmit capability information to the network indicating a coherence capability of the UE for transmitting multiple layers on a single antenna port. In some cases, the indicated capability information may actually be less than the actual capability of the UE 115, but may indicate which transmission precoding matrix indicator (TPMI) indexes are valid, such that the UE115 is not expected to transmit complex waveforms resulting from too many layers per antenna port. For example, a UE 115 may be non-coherent (e.g., unable to maintain phase continuity across antenna ports), may be partially coherent (e.g., able to maintain phase continuity across two antenna ports), or fully coherent (e.g., capable of maintaining phase continuity across all ports). In some examples, the UE 115 may indicate, in the capability information, a maximum number of layers per antenna port it can support. For instance, a partially coherent UE 115 may indicate no more than 1 layer per antenna port. In such examples, the network may only indicate TPMIs that satisfy this capability (e.g., the UE 115 will not be expected to transmit multiple layers via a single antenna port). In some examples, the UE 115 may indicate its coherence capability on a per-rank basis. In such examples, the UE 115 may indicate that it is fully coherent for rank 1, but partially coherent for rank 2, and/or partially coherent or non-coherent for rank 3, etc.

In some examples, the UE 115 may be capable of supporting up to 8 layers per antenna port. In some cases, codebooks may be restricted to support 8 layer transmissions. For example, an 8 transmitter codebook may be constructed from two 4 transmitter codebooks, where the first four antenna ports are used to transmit a first subset of layers, and the next set of four antenna ports are used to transmit the remaining layers. In some examples, codebooks may be constrained to ensure that a first subset of antenna ports using a first modulation coding scheme (MCS) (associated with a transport block, or a subset of layers) do not overlap with a second subset of antenna ports.

Figure 2:
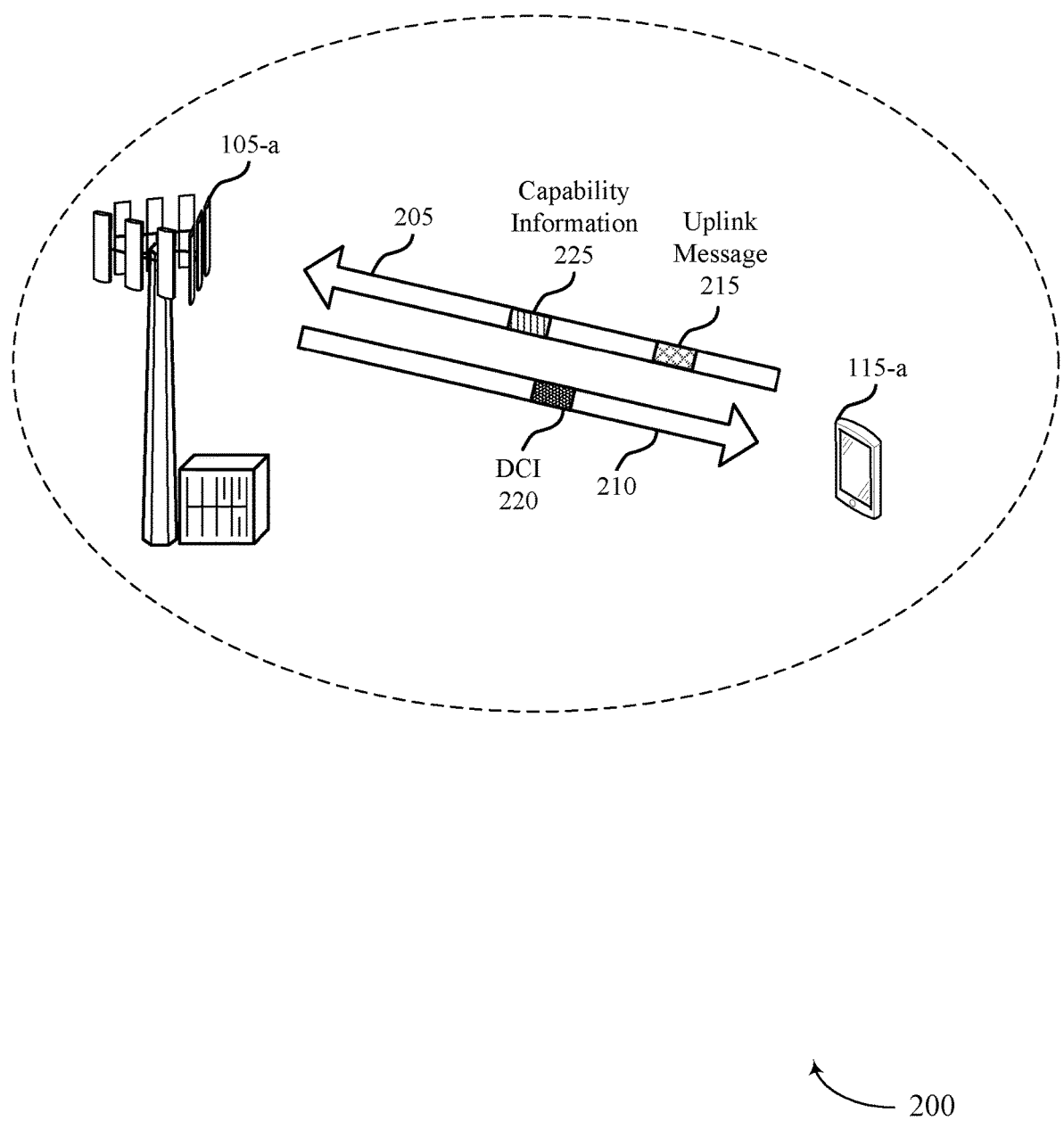
FIG. 2 illustrates an example of a wireless communications system 200 that supports transmission precoding matrix indicator grouping and designs for uplink multi-layer transmissions in accordance with one or more aspects of the present disclosure.

FIG. 2 illustrates an example of a wireless communications system 200 that supports transmission precoding matrix indicator grouping and designs for uplink multi-layer transmissions in accordance with one or more aspects of the present disclosure. Wireless communications system 200 may implement, or be implemented by, aspects of wireless communications system 100. For example, the wireless communications system 200 may include a UE 115-a and a network entity 105-a, which may be examples of corresponding devices described with reference to FIG. 1. The UE 115-a and the network entity 105-a may communicate via uplink 205 and downlink 210. The UE 115-a may be a multi-antenna UE 115.

The UE 115-a may support multi-layer codebook-based uplink transmissions (e.g., on a physical uplink shared channel (PUSCH)). The UE may support multiple precoder codebooks to use for such multi-layer codebook-based PUSCH transmissions. The UE 115-a may use a codebook for an uplink transmission that is dependent on a number of transmission antenna ports at the UE 115-a, and the ability of the UE 115-a to maintain phase coherence across antenna ports. Some wireless communications systems may not support precoders codebooks in which a single antenna port transmits multiple layers. However, other wireless communications systems (e.g., a 5G NR system) may support such precoder codebooks.

Precoder codebooks that utilize a single antenna port to transmit multiple layers may result in increased complexity at the UE 115-a. For instance, the UE 115-a may be technically able to support a precoder of the form:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

If the UE 115-a uses such a precoder to transmit two layers (e.g., on a PUSCH) with a quadrature phase shift keying (QPSK) constellation, then an effective constellation seen by each antenna port may be, effectively, a 25 QAM constellation (e.g., 4 layers plus 4 QAM plus no random phase). Transmitting uplink signaling according to a 25 QAM constellation may require special handling by the UE transmitter. That is, the UE 115-a (e.g., or the receiver at the network entity 105-a) cannot successfully communicate such uplink signaling by treating it as a simple QPSK waveform. Similarly, a two transmitter UE (e.g., transmitting two layers) using a similar precoder may effectively see a 9 QAM constellation.

If the UE 115-a supports a number (e.g., K) of layers per antenna port with each layer having a same or different value (M) of M-QAM constellations, may change the fundamental nature of the waveform. A UE transmitter could successfully transmit such waveforms if it could rely on waveform specific configurations, parameters, settings, etc. Such additional parameters and configurations may result in additional signaling overhead, or may not be available to a UE 115-a. In such examples, the UE 115-a may be capable of transmitting multiple layers at a single antenna port and generating the corresponding unique waveforms. However, the UE 115-a, or one or more receiving devices, may not be configured with or may not have access to parameters that would allow the UE 115-a to successfully transmit such a waveform. For instance, the UE 115-a may not be configured with one or more constraints to ensure that such a waveform is generated and transmitted in a satisfactory manner (e.g., threshold requirements for EVM, ACLR, IBE, SEM. Such constraints ensure appropriate power usage, avoid interference, address error standards, etc. Without such constraints, the UE 115-a may generate and transmit a waveform that has too high of an error rate, excessive power leakage and interference. In some examples, such constraints for the unique waveforms generated by transmitting multiple layers on a single antenna port may not be defined (e.g., or may only apply to a threshold number of layers per antenna port), or may not be accessible by the UE 115-a.

In some examples, the UE 115-a may determine one or more precoding matrices to use for precoding uplink signaling. Precoding matrix may be associated with various TPMI indices. Each TPMI index may indicate a precoder for the UE 115-a to use for a subsequent uplink message 215.

TPMIs may be classified based on a UE coherence capability. For example, table 1 defines a set of precoding matrixes W. Table 1 may define a set of precoding matrices for two-layer transmissions using Four Antenna Ports.

TABLE 1

| TPMI index | W (ordered from left to right in increasing order of TPMI index) | | | |
|---|---|---|---|---|
| 0-3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |

TABLE 1-continued

| TPMI index | W (ordered from left to right in increasing order of TPMI index) | | | |
|---|---|---|---|---|
| 4-7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

UE coherence may be defined as the ability of the UE 115-a to maintain phase coherence across antenna ports between the time antenna sounding occurs to the time uplink transmissions occur on a PUSCH. UE coherence capability may be divided into types. Non-coherent UEs may have no ability to maintain phase coherence across antenna ports; partially coherent UEs may have the ability to maintain phase coherence across a pair of antenna ports; and fully coherent UEs may have the ability to maintain phase coherence across all antenna ports (e.g., four antenna ports, or eight antenna ports). For example, a non-coherent UE may support TPMI indices 0-5 (e.g., in which no single antenna port is indicated to transmit both of the two supported layers). A partially coherent UE may support TPMI indices 1-13. A fully coherent UE may be expected to support an entire set of precoders (e.g. TPMI indices 0-21). However supporting all precoders may meant that the UE 115-a is expected to handle new waveform times having QAM constellations such as 9-QAM or 25-QAM, etc. As discussed herein, the UE 115-a may not have access to or may not have been figured with the appropriate parameters, configurations, or constraints, to support generating and signaling of such waveforms.

In some examples, the UE 115-a may determine, and indicate to the network entity 105-a, which TPMIs the UE 115-a supports. For example, the UE 115-a may be capable of supporting all precoders in a set of precoders for one or more ranks. However, the UE 115-a may not have access to parameters or constraints to render such waveforms feasible for uplink signaling. In such examples, the UE 115-a may indicate, to the network entity 105-a, a threshold (e.g., maximum) of layers per antenna port that it supports. Such capability signaling may allow the UE 115-a to flexibly determine which TPMIs are considered valid, and to avoid waveforms that the UE 115-a does not support, or that may lead to power leakage, interference, high error rates, etc. Such techniques may result in improved throughput, decreased signaling overhead for the UE 115-a, more reliable wireless communications, and decreased latency. For instance, a two transmitter UE that is fully coherent may indicate that it supports no more than one layer per antenna port. The UE 115-a may include such an indication in capability information 225. In such examples, the network entity 105-a may honor the capability information. For instance, if the two transmitter UE 115-a that is fully coherent indicates that it supports no more than 1 layer per antenna port, then the UE may be signaled to use a precoder of the form $$\begin{bmatrix} 1 \\ 1 \end{bmatrix},$$

but may not be signaled to use a precoder of the form $$\begin{bmatrix} 1 & 1 \\ 1 & -1 \end{bmatrix}.$$

That is, by indicating capability information 225, the UE 115-a may indicate which TPMIs of a set of TPMIs are valid, and the network entity 105-a may only indicate (e.g., in the DCI 220) valid TPMIs.

For example, the UE 115-a may support up to four layers. The UE 115-a may determine a set of precoders associated with a set of TPMIs. For instance, the following tables may represent TPMIs configured for various ranks. Table 2 may indicate precoding matrix W for single-layer transmissions using four antenna ports, Table 3 may indicate precoding matrix W for two-layer transmission using four antenna ports, table 4 may indicate precoding matrix W for three-layer transmissions using four antenna ports, and table 5 may indicate precoding matrix W for four-layer transmissions using four antenna ports.

TABLE 2

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 3

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

TABLE 4

| TPMI index | W (ordered from left to right in increasing order of TPMI index) | | | |
|---|---|---|---|---|
| 0-3 | $\frac{1}{2}\begin{bmatrix}1 & 0 & 0\\ 0 & 1 & 0\\ 0 & 0 & 1\\ 0 & 0 & 0\end{bmatrix}$ | $\frac{1}{2}\begin{bmatrix}1 & 0 & 0\\ 0 & 1 & 0\\ 1 & 0 & 0\\ 0 & 0 & 1\end{bmatrix}$ | $\frac{1}{2}\begin{bmatrix}1 & 0 & 0\\ 0 & 1 & 0\\ -1 & 0 & 0\\ 0 & 0 & 1\end{bmatrix}$ | $\frac{1}{2\sqrt{3}}\begin{bmatrix}1 & 1 & 1\\ 1 & -1 & 1\\ 1 & 1 & -1\\ 1 & -1 & -1\end{bmatrix}$ |
| 4-6 | $\frac{1}{2\sqrt{3}}\begin{bmatrix}1 & 1 & 1\\ 1 & -1 & 1\\ j & j & -j\\ j & -j & -j\end{bmatrix}$ | $\frac{1}{2\sqrt{3}}\begin{bmatrix}1 & 1 & 1\\ -1 & 1 & -1\\ 1 & 1 & -1\\ -1 & 1 & 1\end{bmatrix}$ | $\frac{1}{2\sqrt{3}}\begin{bmatrix}1 & 1 & 1\\ -1 & 1 & -1\\ j & j & -j\\ -j & j & j\end{bmatrix}$ | — |

TABLE 5

| TPMI index | W (ordered from left to right in increasing order of TPMI index) | | | |
|---|---|---|---|---|
| 0-3 | $\frac{1}{2}\begin{bmatrix}1 & 0 & 0 & 0\\ 0 & 1 & 0 & 0\\ 0 & 0 & 1 & 0\\ 0 & 0 & 0 & 1\end{bmatrix}$ | $\frac{1}{2\sqrt{2}}\begin{bmatrix}1 & 1 & 0 & 0\\ 0 & 0 & 1 & 1\\ 1 & -1 & 0 & 0\\ 0 & 0 & 1 & -1\end{bmatrix}$ | $\frac{1}{2\sqrt{2}}\begin{bmatrix}1 & 1 & 0 & 0\\ 0 & 0 & 1 & 1\\ j & -j & 0 & 0\\ 0 & 0 & j & -j\end{bmatrix}$ | $\frac{1}{4}\begin{bmatrix}1 & 1 & 1 & 1\\ 1 & -1 & 1 & -1\\ 1 & 1 & -1 & -1\\ 1 & -1 & -1 & 1\end{bmatrix}$ |
| 4 | $\frac{1}{4}\begin{bmatrix}1 & 1 & 1 & 1\\ 1 & -1 & 1 & -1\\ j & j & -j & -j\\ j & -j & -j & j\end{bmatrix}$ | — | — | — |

The UE 115-*a* may determine the precoders of tables 2-5. The precoders in tables 2-5 may be preconfigured at the UE 115-*a*, or may be included in one or more standards documents. If the UE 115-*a* is a coherent UE that can support up to two layers per antenna port, and indicates so in the capability information 225, then the UE 115-*a* may be able to support any TPMIs in table 1, as table 1 does not indicate any TPMIs for which the UE 115-*a* would transmit more than two layers on a single antenna port (e.g., TPMI indices 0-27 of table 1 are valid). The UE 115-*a* may also be able to support any TPMIs in table 2, as table 2 also does not indicate any TPMIs for which the UE 115-*a* would transmit more than two layers on a single antenna port (e.g., TPMI indices 0-21 are valid). However, because TPMI indices 3-6 of table 4 indicate precoders on which the UE 115-*a* would transmit three layers on a single antenna port, the UE 115-*a* may not be expected to use such precoders (e.g., as they would result in unique waveforms not supported by the UE 115-*a*). Thus, the network entity may consider only TPMI indices 0-2 as valid (e.g., and may refrain from indicating TPMIs indices 4-6 in the DCI 220). Similarly, TPMI indices 3-4 of table 5 may indicate precoders for which the UE 115-*a* would transmit three or four layers on a single antenna port. Thus, TPMI indices 0-2 of table 5 may be considered valid, but TPMI indices 3-4 may be considered invalid. Such techniques may permit the UE 115-*a* to avoid transmitting waveforms that it does not support, even if the UE 115-*a* is considered fully coherent.

In some examples, the UE 115-*a* may indicate, in the capability information 225, a coherence capability of the UE 115-*a* on a per-rank basis. For example, instead of indicating a threshold number of layers per antenna port, the UE 115-*a* may indicate a coherence capability for each rank. As rank increases, the UE 115-*a* may indicate a lower coherence capability so as to avoid having to send transmissions according to precoders that require too many layers per antenna port.

TPMIs for each rank may be associated with different coherence levels. For instance, table 2 may refer to precoders for rank 1, table 3 may refer to precoders for rank 2, table 4 may refer to precoders for rank 3, and table 5 may refer to precoders for rank 4. For table 2, TPMI indices 0-3 may be associated with non-coherence, TPMI indices 4-11 may be associated with partial coherence, and TPMI indices 12-27 may be associated with full coherence. For table 3, TPMI indices 0-5 may be associated with non-coherence, TPMI indices 6-13 may be associated with partial coherence, and TPMI indices 14-21 may be associated with full coherence. For table 4, TPMI index 0 may be associated with non-coherence, TPMI indices 1-2 may be associated with partial coherence, and TPMI indices 3-6 may be associated with full coherence. For table 5, TPMI index 0 may be associated with non-coherence, TPMI indices 1-2 may be associated with partial coherence, and TPMI indices 3-4 may be associated with full coherence.

The UE 115-*a* may support four layers, but may only support one layer at a time per antenna port. In such examples, the UE 115-*a* may indicate, in the capability information 225, that it is fully coherent for rank 1 (e.g., TPMI indices 0-27 are valid for table 2), that it is partially coherent for rank 2 (e.g., TPMI indices 0-13 are valid for table 3), that it is partially coherent for rank 3 (e.g., TPMI indices 0-2 are valid for table 4), and that it is non-coherent for rank 4 (e.g., TPMI index 0 is valid for table 5). The UE may therefore limit TPMIs configured by the network entity 105-*a* such that only valid TPMIs (e.g., TPMIs that will not result in unique waveforms not supported by the UE 115-*a*) are indicted by the network entity 105-*a* in the DCI 220.

In some examples, the UE 115-*a* may support a number of transmitters, and a number of layers (e.g., eight antenna ports). In some examples, the wireless communications system 200 may support a generalized codebook in which eight antenna port carriers up to eight layers. To support such codebooks, the network may impose constraints on UE transmitter codebook design. In some examples, constraints may be applied to codebook structure. For example, codebooks may be limited such that a number of layers per antenna port does not exceed a threshold value (e.g., K). For instance, an eight transmitter codebook may be constructed from four transmitter codebooks. In such examples, the first four antenna ports at the UE 115-*a* may be used to transmit a certain set of layers, while the next set of four antenna ports at the UE 115-*a* may be used to transmit the remaining layers. The network entity 105-*a* may select and indicate such codebooks for the UE 115-*a*, such as the codebook structure:

$$\begin{bmatrix} 1 & 1 & 1 & 1 & & & & \\ 1 & -1 & 1 & -1 & & & 0 & \\ 1 & 1 & -1 & -1 & & & & \\ 1 & -1 & -1 & 1 & & & & \\ & & & & 1 & 1 & 1 & 1 \\ & & 0 & & 1 & -1 & 1 & -1 \\ & & & & 1 & 1 & -1 & -1 \\ & & & & 1 & -1 & -1 & 1 \end{bmatrix}$$

In some examples, codebooks such as these (e.g., codebooks built for a large number of antenna ports, but constructed of smaller codebooks for a smaller number of antenna ports) may be configured at the network (e.g., all available or selected codebooks satisfy such constraints). In some examples, other codebook constructions may be available, the network may only select codebooks that satisfy such constraints for one or more UEs 115-*a* (e.g., based on UE capability information).

In some examples, layers supported by the UE 115-*a* may be mapped to an antenna port at the UE may have the same modulation and coding scheme (MCS) order. The UE may transmit multiple transport blocks (TBs) using multiple layers, and multiple MCS orders. For instance, the UE 115-*a* may support eight layers, and may transmit two TBs using two MCSs. A set of four layers may be identified to carry the first TB, and a second set of four layers may carry the remaining TB. In some examples, precoder design may be constrained such that antenna ports caring the first set of layers do not overlap with the set of antenna ports used to transit the other set of layers. In some examples, precoder codebook design may be constrained such that antenna ports carrying the first TB do not overlap with the antenna ports used to transmit the other TB. In some examples, codebooks such as these (e.g., codebooks constructed such that antenna ports carrying a first TB do not overlap with antenna ports carrying a second TB, or such that a first set of layers carrying a first TB do not overlap with a second set of layers carrying a second TB) may be configured at the network (e.g., all available or selected codebooks satisfy such constraints). In some examples, other codebook constructions may be available, the network may only select codebooks that satisfy such constraints for one or more UEs 115-*a* (e.g., based on UE capability information).

Figure 3:
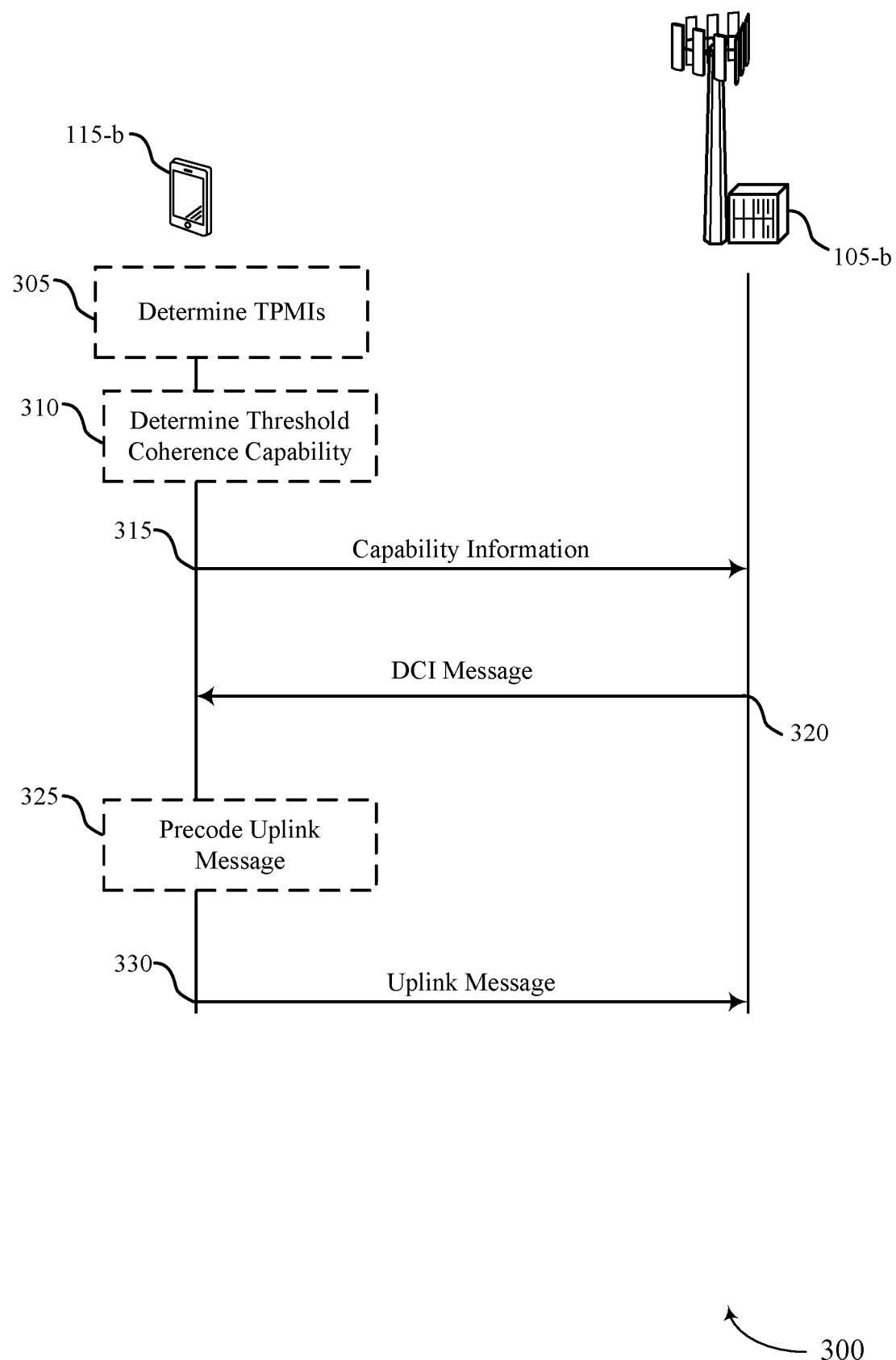
FIG. 3 illustrates an example of a process flow that supports transmission precoding matrix indicator grouping and designs for uplink multi-layer transmissions in accordance with one or more aspects of the present disclosure.

FIG. 3 illustrates an example of a process flow 300 that supports transmission precoding matrix indicator grouping and designs for uplink multi-layer transmissions in accordance with one or more aspects of the present disclosure. Process flow 300 may implement, or be implemented by, aspects of wireless communications system 100 and wireless communications system 200. For example, the process flow 300 may include a network entity 105-*b* and a network entity 105-*b*, which may be examples of corresponding devices described with reference to FIG. 1 and FIG. 2.

At 305, the UE 115-*b* may determine multiple TPMIs. Each TPMI of the multiple of TPMIs may be associated with a number of antenna ports and a number of transmission layers per antenna port at the UE 115-*b*. The UE 115-*b* may identify one or more lookup tables (e.g., preconfigured tables or standardized tables), each lookup table associated with a number of transmission layer (e.g., a respective transmission rank) (e.g., various lookup tables, such as tables 1-5 as described with reference to FIG. 1), where each UE coherence value is associated with a respective lookup table.

At 315, the UE 115-*b* may transmit a capability information indicating transmission coherence information of the UE 115-*b*. The transmission coherence information may include an indication of a threshold number of transmission layers supported by the UE 115-*b* for each antenna port at the UE 115-*b*. In some examples, the capability information may include an indication of multiple UE coherence values, one UE coherence value for each rank (e.g., each respective transmission layer of multiple transmissions layers supported by the UE).

In some examples, at 310, the UE 115-*a* may determine a coherence capability associated with a first coherence type of a set of coherence types (e.g., non-coherent, partially coherent, or fully coherent). In such examples, the UE 115-*a* may include an indication of the coherence type in the capability information transmitted at 315. In some examples, the indicated coherence level (e.g., coherence level per rank or number of layers supported per antenna port) may be less than a coherence level actually supported by the UE 115-*b*. That is, the UE 115-*b* may be fully coherent (e.g., or partially coherent), but may determine that some fully coherent TPMIs may result in unique waveforms not supported by the UE 115-*b*. In such examples, the UE 115-*b* may indicate, in the capability information at 315, a capability level that is less than an actual coherence level of the UE 115-*b* (e.g., may indicate a subset of TPMIs as valid).

At 320, the UE 115-*b* may receive a DCI message indicating a TPMI index according to the capability information. For instance, the network entity 105-*b* may select a TPMI index that is considered valid based on the capability information (e.g., that does not exceed the threshold number of layers per antenna port, or does not exceed a coherence pe rank).

At 330, the UE 115-*b* may transmit an uplink message according to the precoder indicated by the DCI message at 320. In some examples, at 325, the UE 115-*b* my precode the uplink message according to the precoder indicated by the TPMI index of the DCI message. In some examples, the precoding may include a precoding configuration including a first precoder for a first subset of a total number of antenna ports supported by the UE and the second precoder for the second subset of the total number of antenna ports supported by the UE (e.g., a precoder for 8 transmit chins may be made up of two smaller precoders for four transmit chains each). The network entity 105-*b* may select precoders for the UE 115-*b* that satisfy constraints (e.g., for subsets of precoders), or all available precoders may be constrained (e.g., in one or more standards documents) to only provide precoders that satisfy such constraints.

In some examples, at 330, the UE 115-*b* may transmit first TB according to a first MCS and a second TB according to a second TB according to a second MCS. The TPMI may indicate a precoding codebook that is constrained such that a first subset of antenna ports for the first set of layers (e.g., 4 layers of a total of 8 layers) does not overlap with a second subset of antenna ports for the second set of layers (e.g., 4 more layers of the total of 8 layers). In some examples, the TPMI may indicate a precoding codebook that is constrained such that a first subset of antenna ports for the first TB do not overlap with a second set of antenna ports for the second TB. In either case, the TPMIs may be selected by the network entity 105-b (e.g., autonomously by the network entity 105-b to satisfy the constraints), or may be selected from a set of TPMIs, all of which satisfy the constraints.

Figure 4:
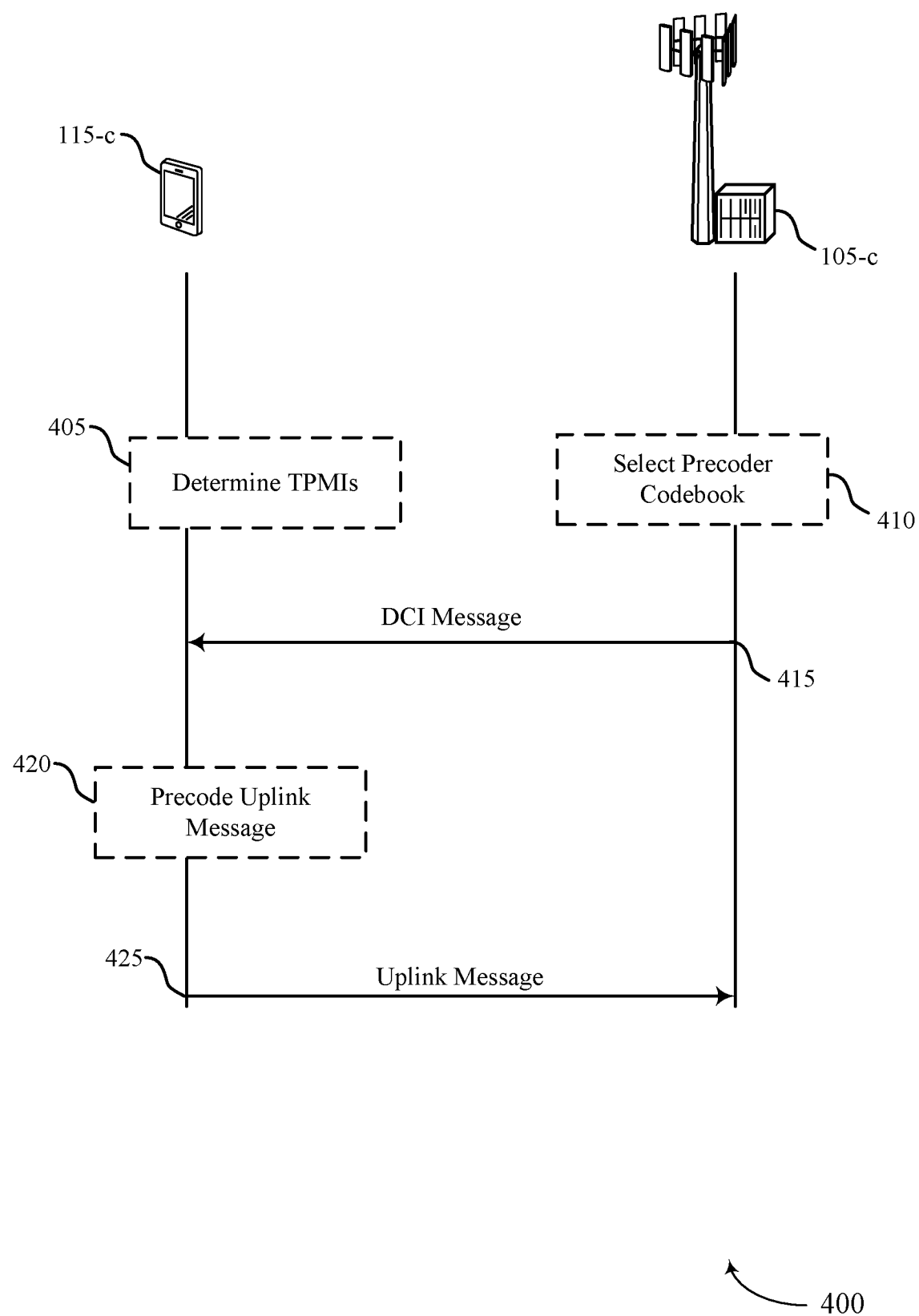
FIG. 4 illustrates an example of a process flow that supports transmission precoding matrix indicator grouping and designs for uplink multi-layer transmissions in accordance with one or more aspects of the present disclosure.

FIG. 4 illustrates an example of a process flow 400 that supports transmission precoding matrix indicator grouping and designs for uplink multi-layer transmissions in accordance with one or more aspects of the present disclosure. Process flow 400 may implement, or be implemented by, aspects of wireless communications system 100 and wireless communications system 200, as well as process flow 400. For example, the process flow 400 may include a network entity 105-c and a network entity 105-c, which may be examples of corresponding devices described with reference to FIG. 1, FIG. 2, and FIG. 3.

At 405, the UE 115-c may determine one or more TPMIs. One or more transmission precoders may be associated with one or more TPMI indices, each TPMI index associated with a number of antenna ports and a number of transmission layers per antenna port at the UE 115-c. The network entity 105-c may also determine the TPMIs. The TPMIs may be preconfigured or included in one or more standards documents.

At 410, the network entity 105-c may select a precoder codebook (e.g., associated with one of the multiple TPMIs determined at 405 by the 115-c). In some examples, the network entity 105-c may select a precoder codebook that satisfies one or more conditions or constraints. For example, the UE 115-c may support a number of transmit chains (e.g., 4). The network entity 105-c may select a precoder codebook that satisfies a constraint such that the codebook is made up of two smaller codebooks (e.g., a first codebook for four antenna ports and a second codebook for four antenna ports, of the form $$\begin{bmatrix} 1 & 1 & 1 & 1 & & & & \\ 1 & -1 & 1 & -1 & & & & \\ 1 & 1 & -1 & -1 & & 0 & & \\ 1 & -1 & -1 & 1 & & & & \\ & & & & 1 & 1 & 1 & 1 \\ & & 0 & & 1 & -1 & 1 & -1 \\ & & & & 1 & 1 & -1 & -1 \\ & & & & 1 & -1 & -1 & 1 \end{bmatrix}$$

In some examples all available precoder codebooks, or a subset of precoder codebooks, may satisfy such a constraint (e.g., one or more standards documents may define a rule such that all selectable precoder codebooks for the UE 115-c satisfy such a constraint). In some examples, the network entity may select, from a set of available precoder codebooks, only precoder codebooks that satisfy the constraint (e.g., the network entity 105-c is responsible for selecting codebooks that satisfy the constraint, even where other precoder codebooks are available). In some examples, the network entity 105-c may select precoder codebooks that satisfy the constraint based on capability signaling, or an explicit request from the UE 115-c, or based on one or more conditions, use cases, performance of the UE 115-c, channel conditions, traffic patterns, or the like.

In some examples, the network entity 105-c may select a precoder codebook that satisfies a constraint, such that all layers mapped to a single antenna port have the same MCS order. For example, the network entity 105-c may select a precoder codebook such that a first set of layers (e.g., four layers) carrying a first TB and a second set of layers carrying a second TB do not overlap (e.g., do not include any of the same antenna ports). In some examples, the network entity 105-c may select a precoder codebook such that a first set of antenna ports carrying the first TB does not overlap with (e.g., are not the same as) a second set of antenna ports used to transmit another TB. In some examples, the network entity may select, from a set of available precoder codebooks, only precoder codebooks that satisfy the constraint (e.g., the network entity 105-c is responsible for selecting codebooks that satisfy the constraint, even where other precoder codebooks are available). In some examples, the network entity 105-c may select precoder codebooks that satisfy the constraint based on capability signaling, or an explicit request from the UE 115-c, or based on one or more conditions, use cases, performance of the UE 115-c, channel conditions, traffic patterns, or the like.

Having selected the precoder codebook that satisfies one or more constraints, or conditions, the network entity 105-c may transmit a DCI message at 415. The DCI message may include an TPMI index, and at 420, the UE 115-c may precode and uplink message according to the TPMI index received at 415. At 425, the UE 115-c may transmit an uplink message according to the precoding at 420 as indicated by the TPMI at 415. The precoding at 420 may be supported by the UE 115-c, as indicated by the TPMI associated with a precoder codebook that satisfies the constraints.

Figure 5:
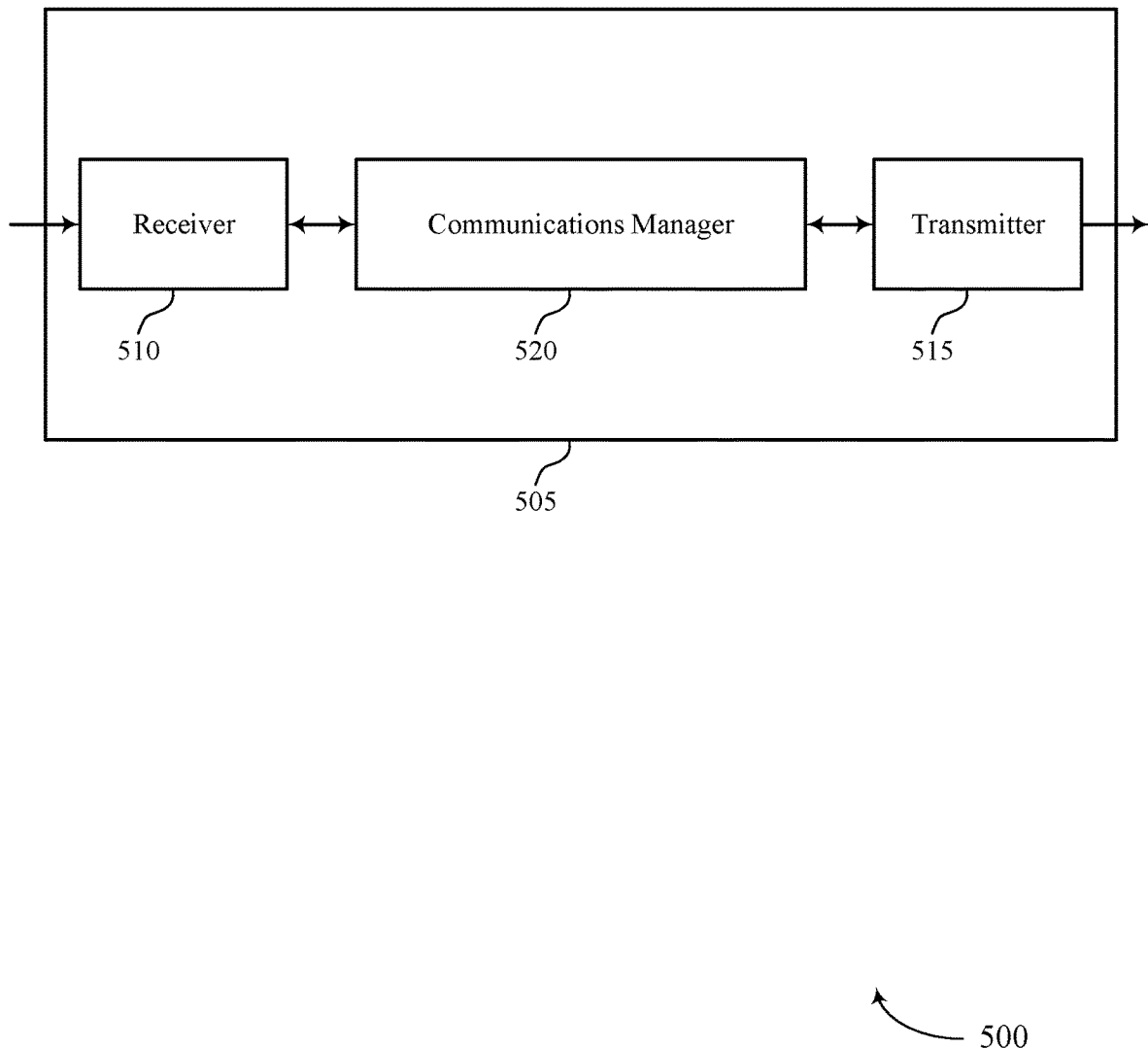
FIGS. 5 and 6 show block diagrams of devices that support transmission precoding matrix indicator grouping and designs for uplink multi-layer transmissions in accordance with one or more aspects of the present disclosure.

FIG. 5 shows a block diagram 500 of a device 505 that supports transmission precoding matrix indicator grouping and designs for uplink multi-layer transmissions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to transmission precoding matrix indicator grouping and designs for uplink multi-layer transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to transmission precoding matrix indicator grouping and designs for uplink multi-layer transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of transmission precoding matrix indicator grouping and designs for uplink multi-layer transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at the UE. The communications manager 520 may be configured as or otherwise support a means for transmitting capability information indicating transmission coherence information of the UE. The communications manager 520 may be configured as or otherwise support a means for receiving a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The communications manager 520 may be configured as or otherwise support a means for transmitting an uplink message based on the transmission precoding matrix indicator and according to the transmission coherence information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for precoding and signaling resulting in consistent and reliable wireless communications, more efficient use of computational resources, and more efficient use of system resources.

Figure 6:
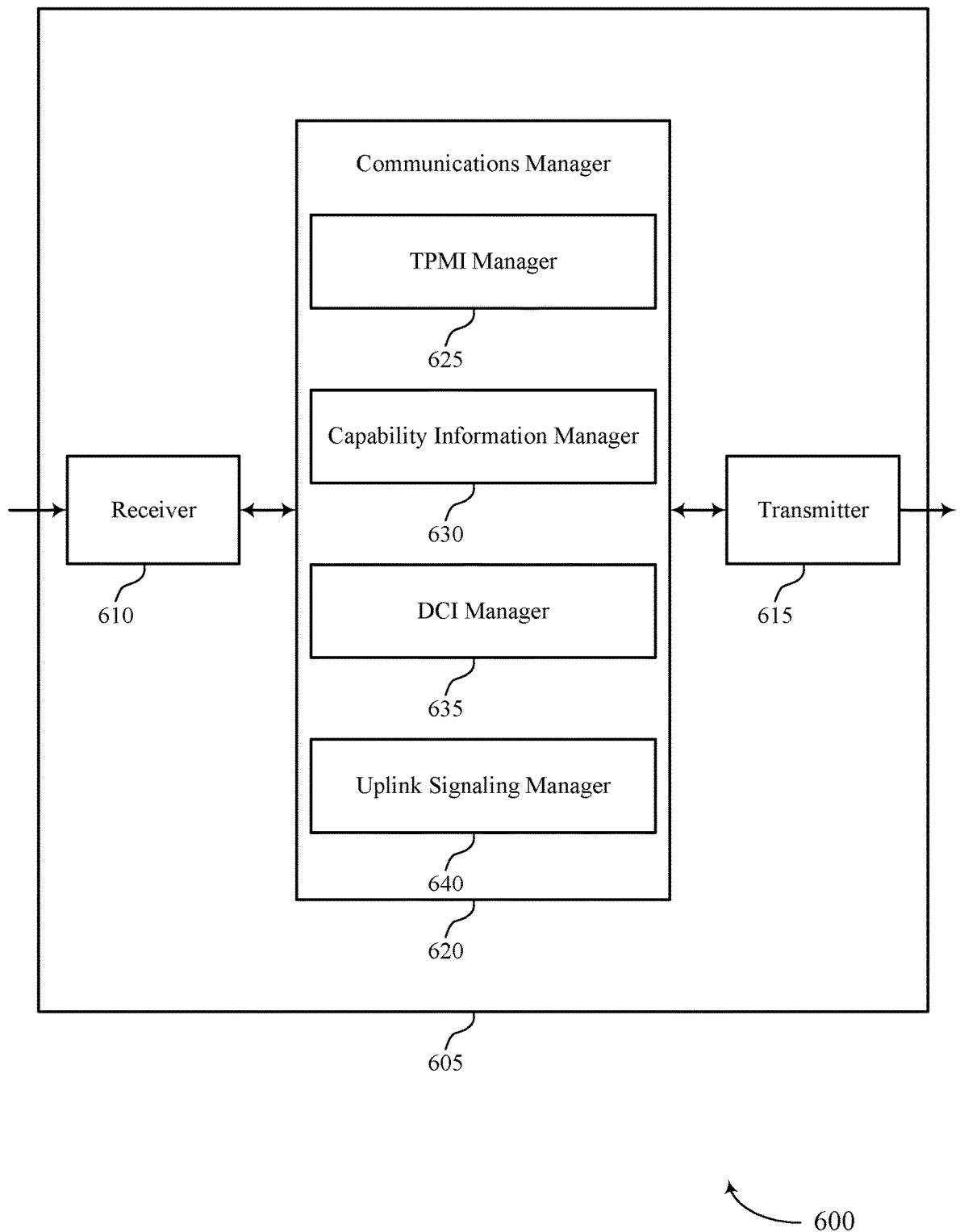

FIG. 6 shows a block diagram 600 of a device 605 that supports transmission precoding matrix indicator grouping and designs for uplink multi-layer transmissions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to transmission precoding matrix indicator grouping and designs for uplink multi-layer transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to transmission precoding matrix indicator grouping and designs for uplink multi-layer transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of transmission precoding matrix indicator grouping and designs for uplink multi-layer transmissions as described herein. For example, the communications manager 620 may include a TPMI manager 625, a capability information manager 630, a DCI manager 635, an uplink signaling manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The TPMI manager 625 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at the UE. The capability information manager 630 may be configured as or otherwise support a means for transmitting capability information indicating transmission coherence information of the UE. The DCI manager 635 may be configured as or otherwise support a means for receiving a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The uplink signaling manager 640 may be configured as or otherwise support a means for transmitting an uplink message based on the transmission precoding matrix indicator and according to the transmission coherence information.

Figure 7:
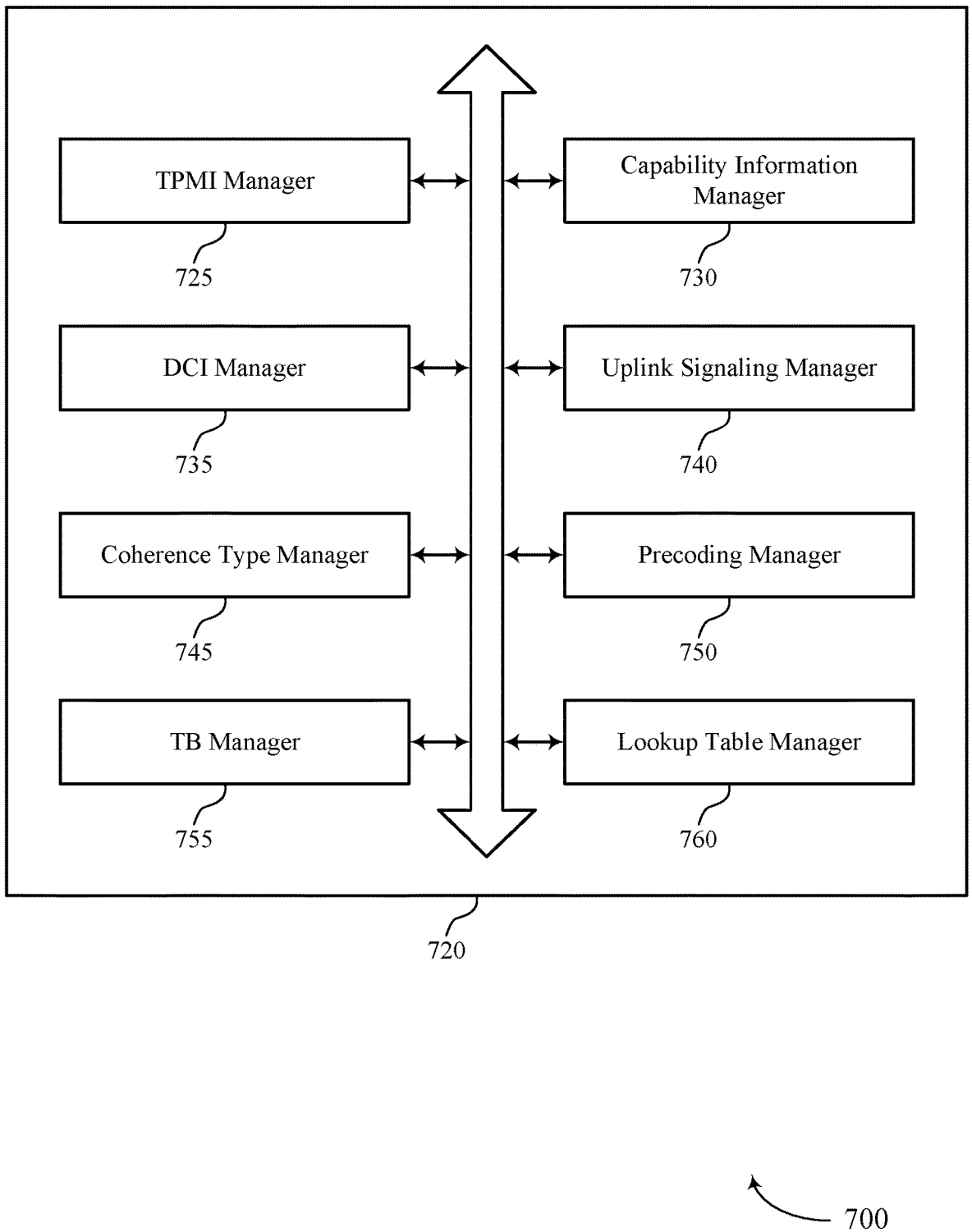
FIG. 7 shows a block diagram of a communications manager that supports transmission precoding matrix indicator grouping and designs for uplink multi-layer transmissions in accordance with one or more aspects of the present disclosure.

FIG. 7 shows a block diagram 700 of a communications manager 720 that supports transmission precoding matrix indicator grouping and designs for uplink multi-layer transmissions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of transmission precoding matrix indicator grouping and designs for uplink multi-layer transmissions as described herein. For example, the communications manager 720 may include a TPMI manager 725, a capability information manager 730, a DCI manager 735, an uplink signaling manager 740, a coherence type manager 745, a precoding manager 750, a TB manager 755, a lookup table manager 760, or any combination thereof. Each of these components may communicate, directly or indirectly, with one another (e.g., via one or more buses).

The communications manager 720 may support wireless communications at a UE in accordance with examples as disclosed herein. The TPMI manager 725 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at the UE. The capability information manager 730 may be configured as or otherwise support a means for transmitting capability information indicating transmission coherence information of the UE. The DCI manager 735 may be configured as or otherwise support a means for receiving a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The uplink signaling manager 740 may be configured as or otherwise support a means for transmitting an uplink message based on the transmission precoding matrix indicator and according to the transmission coherence information.

In some examples, to support transmitting the capability information indicating the transmission coherence information, the capability information manager 730 may be configured as or otherwise support a means for transmitting, in the capability information, an indication of a threshold number of transmission layers supported by the UE for each antenna port at the UE, where the transmission precoding matrix indicator is associated with a transmission precoder matrix that satisfies the threshold number of transmission layers per antenna port.

In some examples, to support transmitting the capability information indicating the transmission coherence information, the capability information manager 730 may be configured as or otherwise support a means for transmitting an indication of a set of multiple UE coherence values, each UE coherence value of the set of multiple UE coherence values corresponding to a respective transmission rank.

In some examples, the coherence type manager 745 may be configured as or otherwise support a means for determining, for each of a plurality of transmission ranks, the capability information comprising a coherence capability associated with a first coherence type of a set of coherence types, the set of coherence types including a first coherence type indicating that the UE is not capable of maintaining phase coherence across any of the number of antenna ports, a second coherence type indicating that the UE is capable of maintaining phase coherence across up to two of the number of antenna ports, and a third coherence type indicating that the UE is capable of maintaining phase coherence across a total number of antenna ports at the UE.

In some examples, to support transmitting the capability information indicating the transmission coherence information, the coherence type manager 745 may be configured as or otherwise support a means for transmitting, for each of the plurality of transmission ranks, an indication of one of the set of coherence types that indicates a coherence type that supports a phase coherence capability that is less than or equal to the coherence capability.

In some examples, the precoding manager 750 may be configured as or otherwise support a means for precoding the uplink message according to a precoding configuration indicated by the transmission precoding matrix indicator, where the precoding configuration includes a first precoder for a first number of antenna ports that is less than a total number of antenna ports supported by the UE and a second precoder for a second number of antenna ports that is less than the total number of antenna ports supported by the UE.

In some examples, to support transmitting the uplink message, the TB manager 755 may be configured as or otherwise support a means for transmitting a first transport block of the uplink message according to a first modulation coding scheme. In some examples, to support transmitting the uplink message, the TB manager 755 may be configured as or otherwise support a means for transmitting a second transport block of the uplink message according to a second modulation coding scheme.

In some examples, the transmission precoding matrix indicator indicates a precoding codebook in which a first subset of a total number of antenna ports supported by the UE carrying a first set of transmission layers does not overlap with a second subset of the total number of antenna ports supported by the UE carrying a second set of transmission layers.

In some examples, the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

Figure 8:
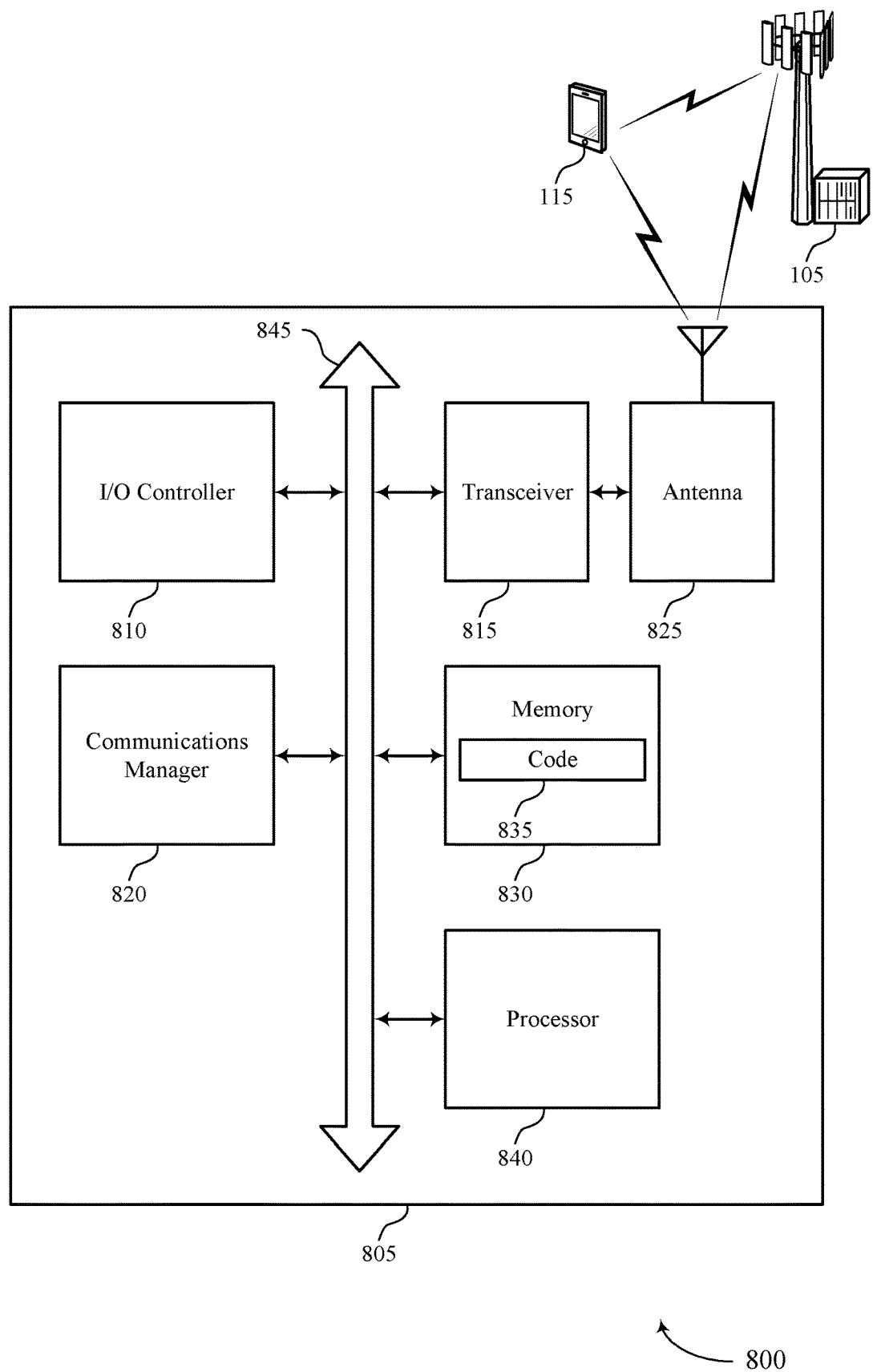
FIG. 8 shows a diagram of a system including a device that supports transmission precoding matrix indicator grouping and designs for uplink multi-layer transmissions in accordance with one or more aspects of the present disclosure.

FIG. 8 shows a diagram of a system 800 including a device 805 that supports transmission precoding matrix indicator grouping and designs for uplink multi-layer transmissions in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or antenna port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting transmission precoding matrix indicator grouping and designs for uplink multi-layer transmissions). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at the UE. The communications manager 820 may be configured as or otherwise support a means for transmitting capability information indicating transmission coherence information of the UE. The communications manager 820 may be configured as or otherwise support a means for receiving a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The communications manager 820 may be configured as or otherwise support a means for transmitting an uplink message based on the transmission precoding matrix indicator and according to the transmission coherence information.

By including or configuring the communications manager 820 in accordance with examples as described herein, the device 805 may support techniques for precoding and signaling resulting in improved reliability of wireless communications, reduced system latency, reduced processing and more efficient use of computational resources, and improved user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of transmission precoding matrix indicator grouping and designs for uplink multi-layer transmissions as described herein, or the processor 840 and the memory 830 may be otherwise configured to perform or support such operations.

Figure 9:
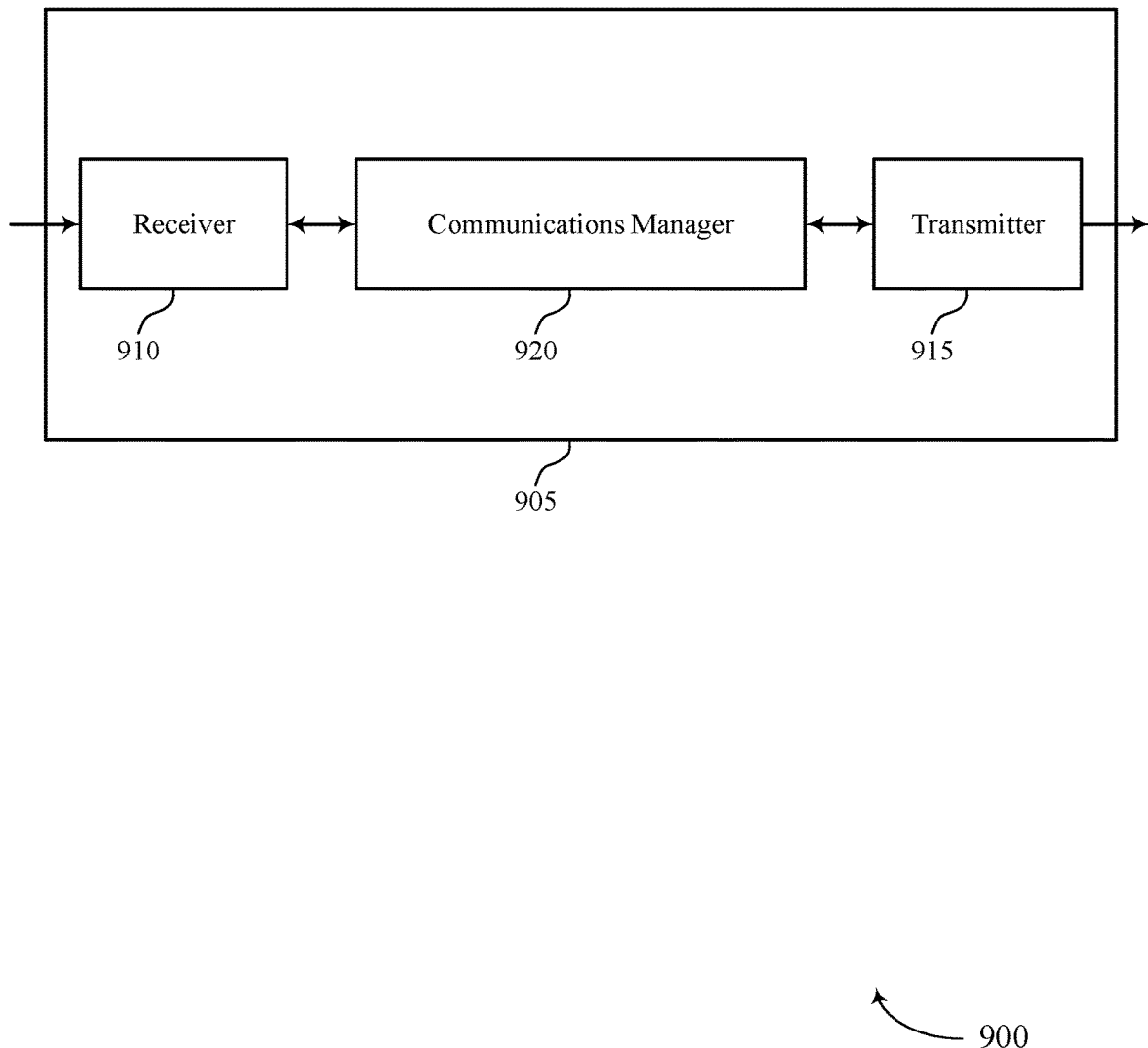
FIGS. 9 and 10 show block diagrams of devices that support transmission precoding matrix indicator grouping and designs for uplink multi-layer transmissions in accordance with one or more aspects of the present disclosure.

FIG. 9 shows a block diagram 900 of a device 905 that supports transmission precoding matrix indicator grouping and designs for uplink multi-layer transmissions in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of transmission precoding matrix indicator grouping and designs for uplink multi-layer transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at a UE. The communications manager 920 may be configured as or otherwise support a means for obtaining capability information indicating transmission coherence information of the UE. The communications manager 920 may be configured as or otherwise support a means for outputting a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The communications manager 920 may be configured as or otherwise support a means for obtaining an uplink message based on the transmission precoding matrix indicator and according to the transmission coherence information.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for precoding and signaling resulting in consistent and reliable wireless communications, more efficient use of computational resources, and more efficient use of system resources.

Figure 10:
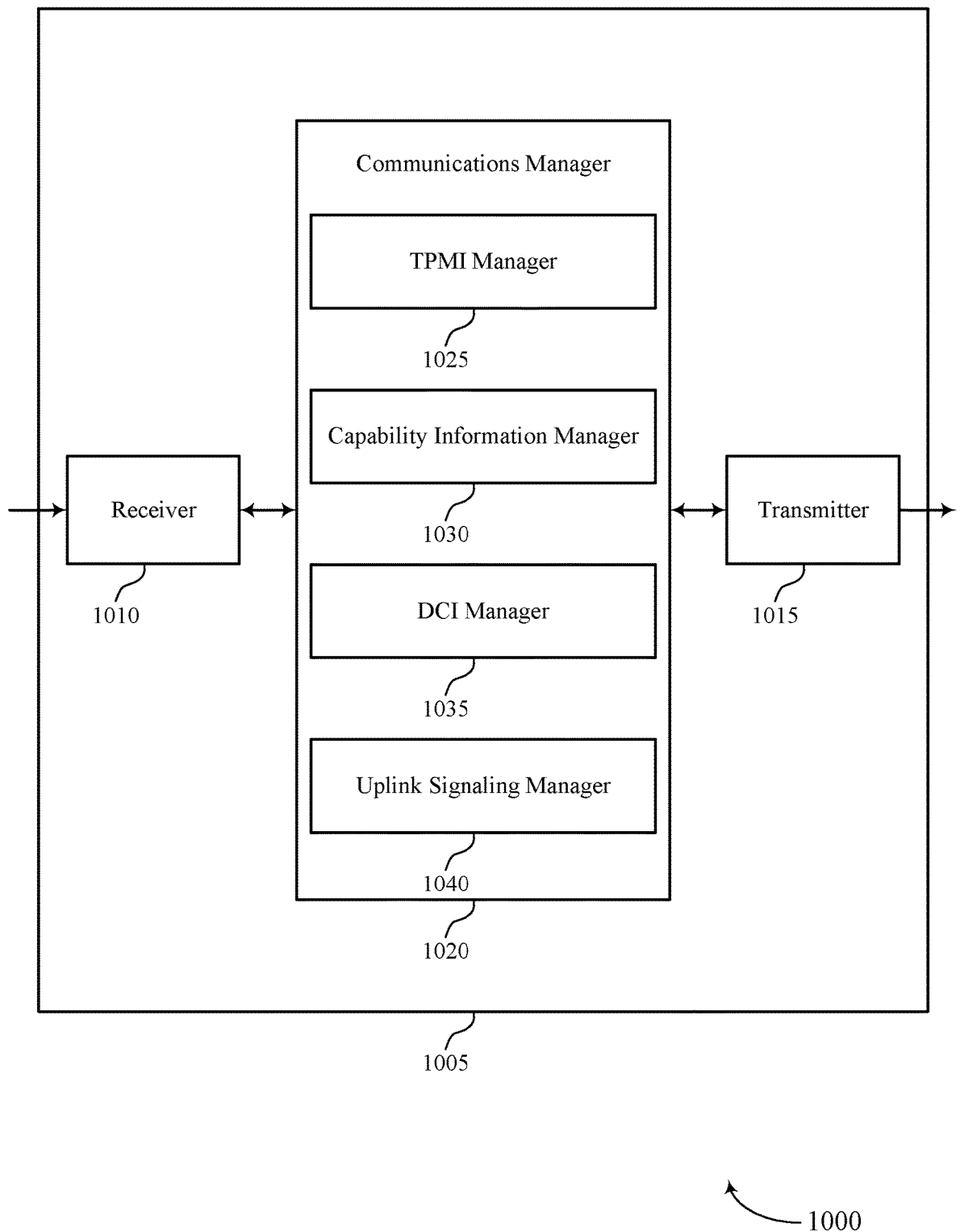

FIG. 10 shows a block diagram 1000 of a device 1005 that supports transmission precoding matrix indicator grouping and designs for uplink multi-layer transmissions in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of transmission precoding matrix indicator grouping and designs for uplink multi-layer transmissions as described herein. For example, the communications manager 1020 may include a TPMI manager 1025, a capability information manager 1030, a DCI manager 1035, an uplink signaling manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The TPMI manager 1025 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at a UE. The capability information manager 1030 may be configured as or otherwise support a means for obtaining capability information indicating transmission coherence information of the UE. The DCI manager 1035 may be configured as or otherwise support a means for outputting a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The uplink signaling manager 1040 may be configured as or otherwise support a means for obtaining an uplink message based on the transmission precoding matrix indicator and according to the transmission coherence information.

Figure 11:
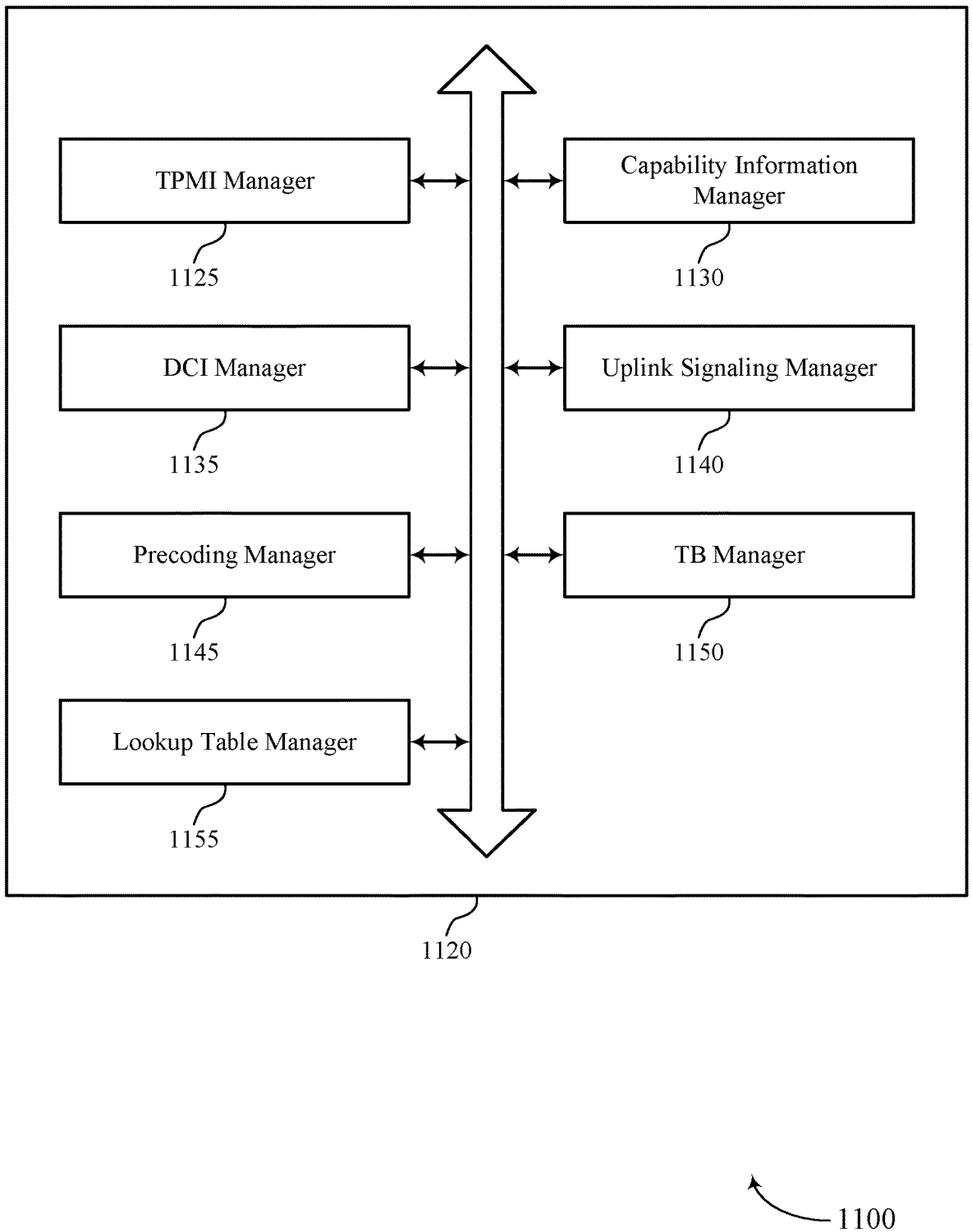
FIG. 11 shows a block diagram of a communications manager that supports transmission precoding matrix indicator grouping and designs for uplink multi-layer transmissions in accordance with one or more aspects of the present disclosure.

FIG. 11 shows a block diagram 1100 of a communications manager 1120 that supports transmission precoding matrix indicator grouping and designs for uplink multi-layer transmissions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of transmission precoding matrix indicator grouping and designs for uplink multi-layer transmissions as described herein. For example, the communications manager 1120 may include a TPMI manager 1125, a capability information manager 1130, a DCI manager 1135, an uplink signaling manager 1140, a precoding manager 1145, a TB manager 1150, a lookup table manager 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The TPMI manager 1125 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at a UE. The capability information manager 1130 may be configured as or otherwise support a means for obtaining capability information indicating transmission coherence information of the UE. The DCI manager 1135 may be configured as or otherwise support a means for outputting a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The uplink signaling manager 1140 may be configured as or otherwise support a means for obtaining an uplink message based on the transmission precoding matrix indicator and according to the transmission coherence information.

In some examples, to support obtaining the capability information indicating the transmission coherence information, the capability information manager 1130 may be configured as or otherwise support a means for obtaining, in the capability information, an indication of a threshold number of transmission layers supported by the UE for each antenna port at the UE, where the transmission precoding matrix indicator is associated with a transmission precoder matrix that satisfies the threshold number of transmission layers per antenna port.

In some examples, to support obtaining the capability information indicating the transmission coherence information, the capability information manager 1130 may be configured as or otherwise support a means for obtaining an indication of a set of multiple UE coherence values, each UE coherence value of the set of multiple UE coherence values corresponding to a respective transmission rank.

In some examples, to support obtaining the uplink message, the precoding manager 1145 may be configured as or otherwise support a means for obtaining the uplink message according to a precoding configuration indicated by the transmission precoding matrix indicator, where the precoding configuration includes a first precoder for a first number of antenna ports that is less than a total number of antenna ports supported by the UE and a second precoder for a second number of antenna ports that is less than the total number of antenna ports supported by the UE.

In some examples, to support obtaining the uplink message, the TB manager 1150 may be configured as or otherwise support a means for obtaining a first transport block of the uplink message according to a first modulation coding scheme. In some examples, to support obtaining the uplink message, the TB manager 1150 may be configured as or otherwise support a means for obtaining a second transport block of the uplink message according to a second modulation coding scheme.

In some examples, the transmission precoding matrix indicator indicates a precoding codebook in which a first subset of a total number of antenna ports supported by the UE carrying a first set of transmission layers does not overlap with a second subset of the total number of antenna ports supported by the UE carrying a second set of transmission layers.

In some examples, the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

Figure 12:
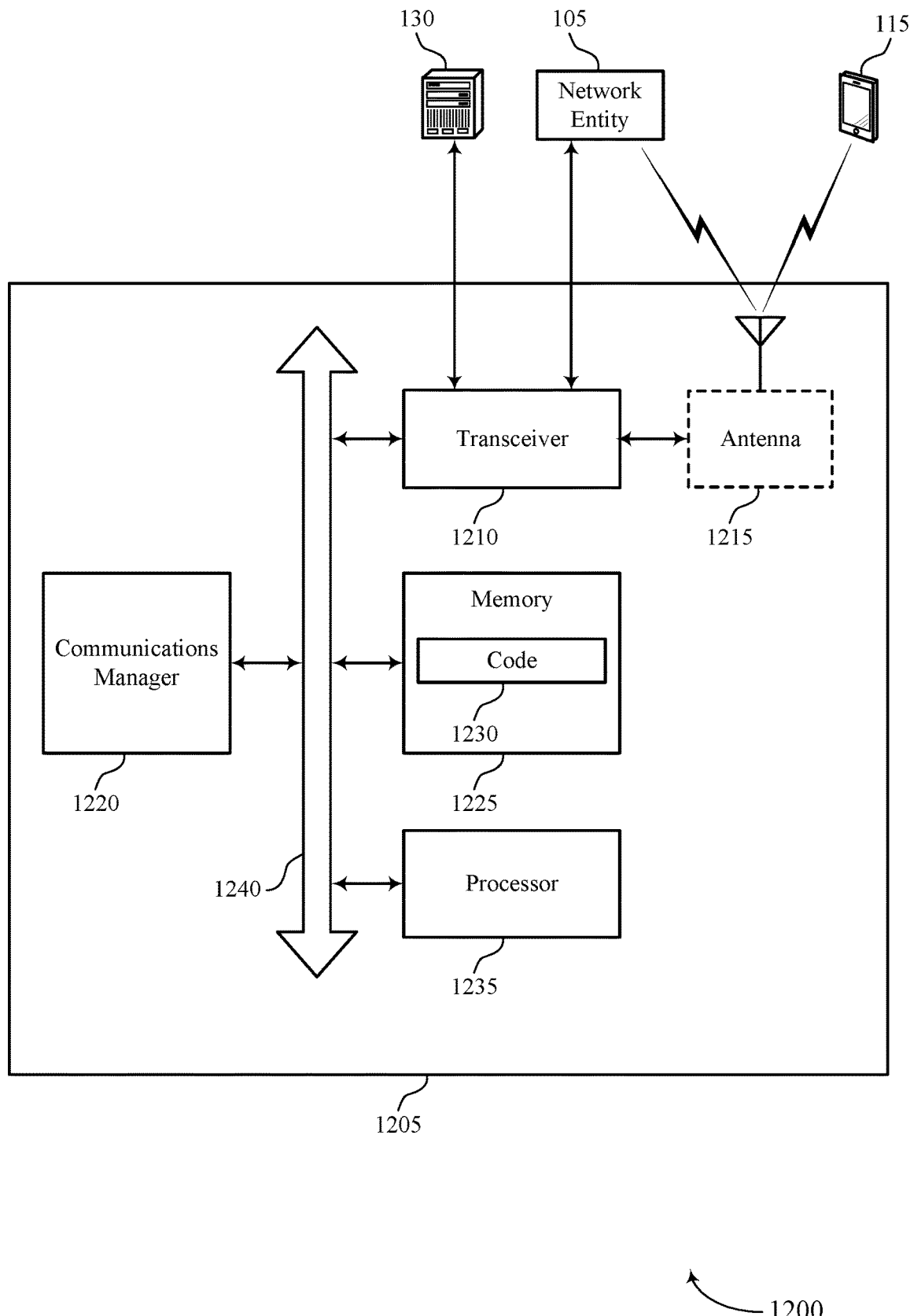
FIG. 12 shows a diagram of a system including a device that supports transmission precoding matrix indicator grouping and designs for uplink multi-layer transmissions in accordance with one or more aspects of the present disclosure.

FIG. 12 shows a diagram of a system 1200 including a device 1205 that supports transmission precoding matrix indicator grouping and designs for uplink multi-layer transmissions in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting transmission precoding matrix indicator grouping and designs for uplink multi-layer transmissions). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for determining a set of multiple transmission precoding matrix indicators, wherein each transmission precoding matrix indicators of the set of multiple transmission precoding matrix indicators associated with a number of antenna ports and a number of transmission layers per antenna port at a UE. The communications manager 1220 may be configured as or otherwise support a means for obtaining capability information indicating transmission coherence information of the UE. The communications manager 1220 may be configured as or otherwise support a means for outputting a downlink control information message including an index value associated with a transmission precoding matrix indicator of the set of multiple transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The communications manager 1220 may be configured as or otherwise support a means for obtaining an uplink message based on the transmission precoding matrix indicator and according to the transmission coherence information.

By including or configuring the communications manager 1220 in accordance with examples as described herein, the device 1205 may support techniques for precoding and signaling resulting in improved reliability of wireless communications, reduced system latency, reduced processing and more efficient use of computational resources, and improved user experience.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of transmission precoding matrix indicator grouping and designs for uplink multi-layer transmissions as described herein, or the processor 1235 and the memory 1225 may be otherwise configured to perform or support such operations.

Figure 13:
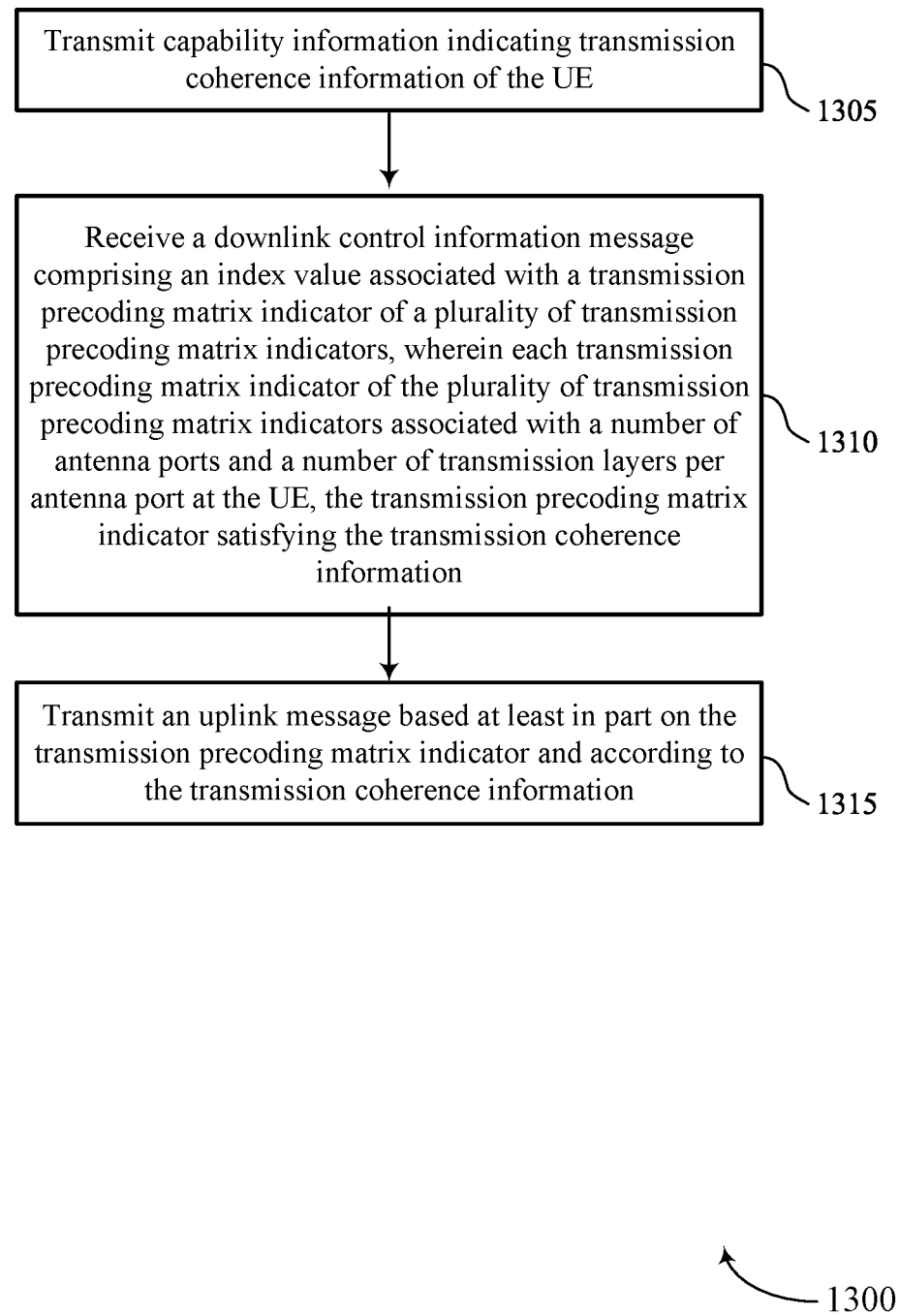
FIGS. 13 through 16 show flowcharts illustrating methods that support transmission precoding matrix indicator grouping and designs for uplink multi-layer transmissions in accordance with one or more aspects of the present disclosure.

FIG. 13 shows a flowchart illustrating a method 1300 that supports transmission precoding matrix indicator grouping and designs for uplink multi-layer transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting capability information indicating transmission coherence information of the UE. The operations of 1305 may be performed in accordance with examples as disclosed herein. In some examples, aspects of the operations of 1305 may be performed by a capability information manager 730 as described with reference to FIG. 7.

At 1310, the method may include receiving a downlink control information message comprising an index value associated with a transmission precoding matrix indicator of a plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The operations of 1310 may be performed in accordance with examples as disclosed herein. In some examples, aspects of the operations of 1310 may be performed by a DCI manager 735 as described with reference to FIG. 7.

At 1315, the method may include transmitting an uplink message based on the transmission precoding matrix indicator and according to the transmission coherence information. The operations of 1315 may be performed in accordance with examples as disclosed herein. In some examples, aspects of the operations of 1315 may be performed by an uplink signaling manager 740 as described with reference to FIG. 7.

Figure 14:
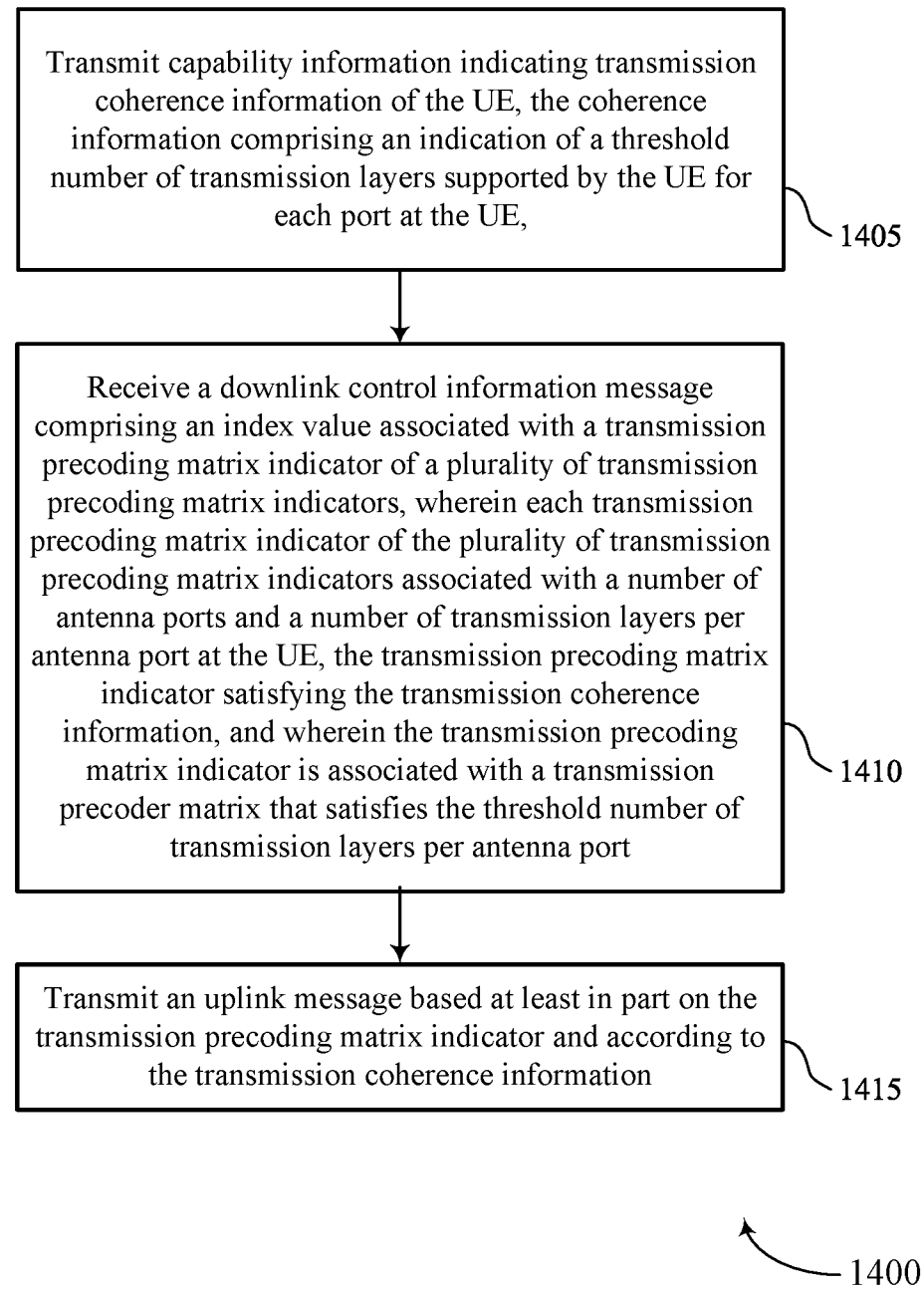

FIG. 14 shows a flowchart illustrating a method 1400 that supports transmission precoding matrix indicator grouping and designs for uplink multi-layer transmissions in accordance with one or more aspects of the present disclosure.

The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting capability information indicating transmission coherence information of the UE, the coherence information comprising an indication of a threshold number of transmission layers supported by the UE for each antenna port at the UE, wherein the transmission precoding matrix indicator is associated with a transmission precoder matrix that satisfies the threshold number of transmission layers per antenna port. The operations of 1405 may be performed in accordance with examples as disclosed herein. In some examples, aspects of the operations of 1405 may be performed by a capability information manager 730 as described with reference to FIG. 7.

At 1410, the method may include receiving a downlink control information message comprising an index value associated with a transmission precoding matrix indicator of a plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information, and wherein the transmission precoding matrix indicator is associated with a transmission precoder matrix that satisfies the threshold number of transmission layers per antenna port. The operations of 1410 may be performed in accordance with examples as disclosed herein. In some examples, aspects of the operations of 1410 may be performed by a DCI manager 735 as described with reference to FIG. 7.

At 1415, the method may include transmitting an uplink message based on the transmission precoding matrix indicator and according to the transmission coherence information. The operations of 1415 may be performed in accordance with examples as disclosed herein. In some examples, aspects of the operations of 1415 may be performed by an uplink signaling manager 740 as described with reference to FIG. 7.

Figure 15:
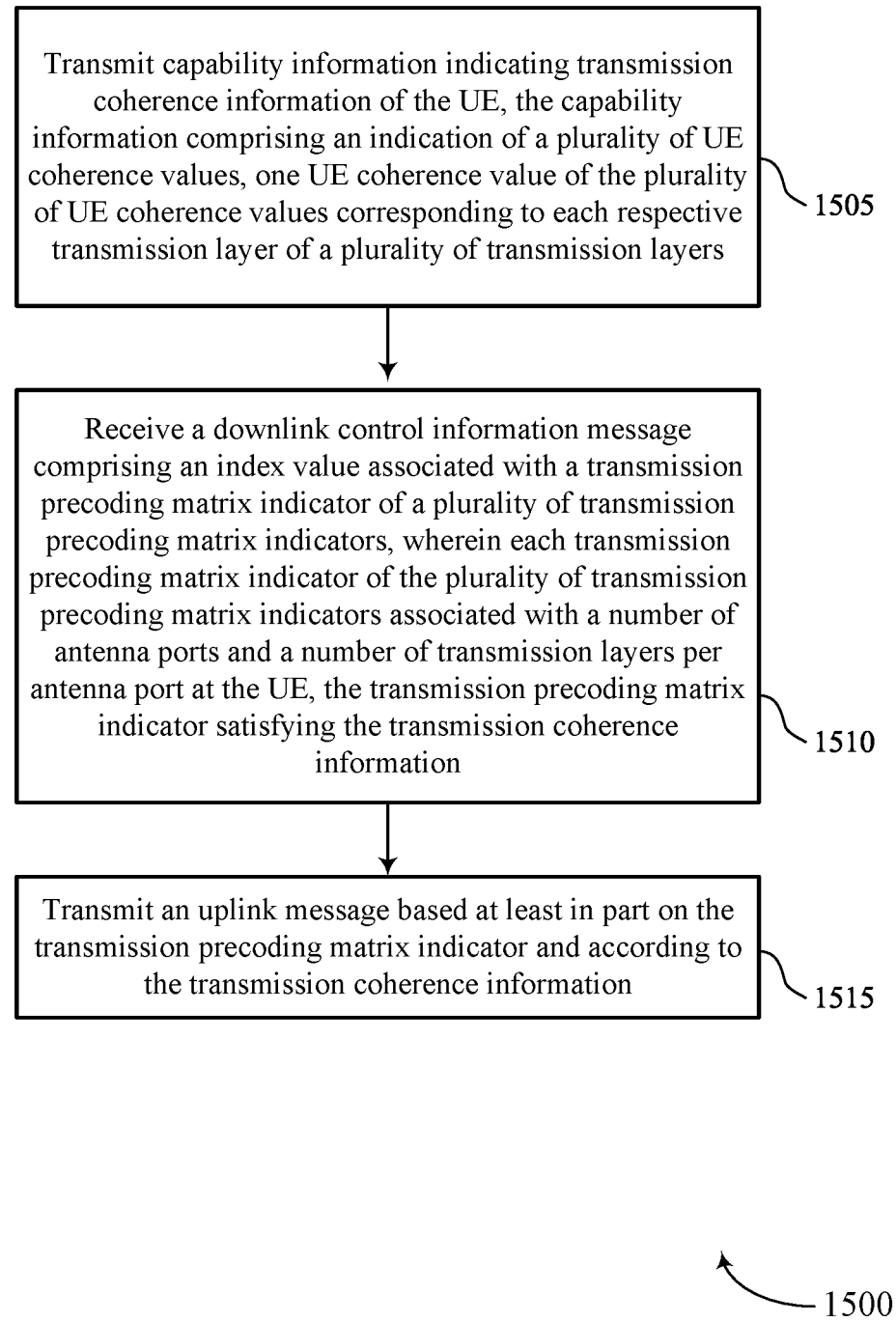

FIG. 15 shows a flowchart illustrating a method 1500 that supports transmission precoding matrix indicator grouping and designs for uplink multi-layer transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting capability information indicating transmission coherence information of the UE, the capability information comprising an indication of a plurality of UE coherence values, each UE coherence value of the plurality of UE coherence values corresponding to a respective transmission rank. The operations of 1505 may be performed in accordance with examples as disclosed herein. In some examples, aspects of the operations of 1505 may be performed by a capability information manager 730 as described with reference to FIG. 7.

At 1510, the method may include receiving a downlink control information message comprising an index value associated with a transmission precoding matrix indicator of a plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The operations of 1510 may be performed in accordance with examples as disclosed herein. In some examples, aspects of the operations of 1510 may be performed by a DCI manager 735 as described with reference to FIG. 7.

At 1515, the method may include transmitting an uplink message based on the transmission precoding matrix indicator and according to the transmission coherence information. The operations of 1515 may be performed in accordance with examples as disclosed herein. In some examples, aspects of the operations of 1515 may be performed by an uplink signaling manager 740 as described with reference to FIG. 7.

Figure 16:
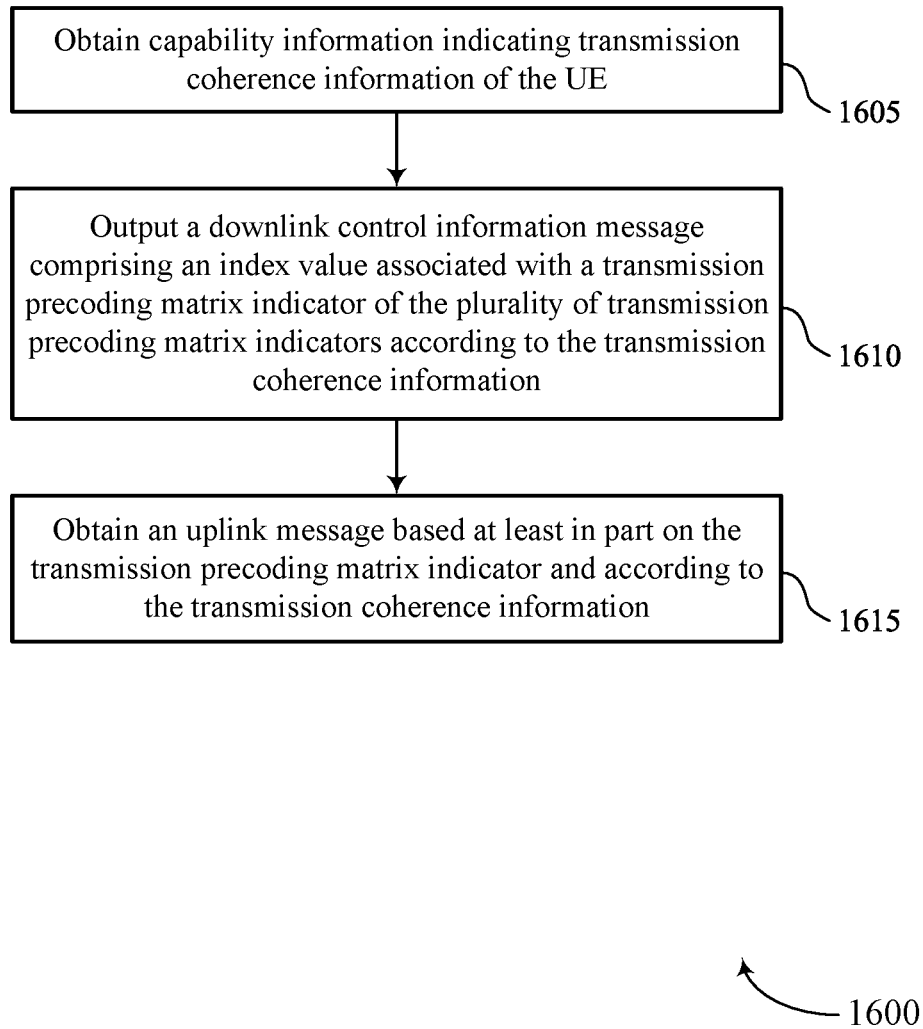

FIG. 16 shows a flowchart illustrating a method 1600 that supports transmission precoding matrix indicator grouping and designs for uplink multi-layer transmissions in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include obtaining capability information indicating transmission coherence information of the UE. The operations of 1605 may be performed in accordance with examples as disclosed herein. In some examples, aspects of the operations of 1605 may be performed by a capability information manager 1130 as described with reference to FIG. 11.

At 1610, the method may include outputting a downlink control information message comprising an index value associated with a transmission precoding matrix indicator of a plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information. The operations of 1610 may be performed in accordance with examples as disclosed herein. In some examples, aspects of the operations of 1610 may be performed by a DCI manager 1135 as described with reference to FIG. 11.

At 1615, the method may include obtaining an uplink message based on the transmission precoding matrix indicator and according to the transmission coherence information. The operations of 1615 may be performed in accordance with examples as disclosed herein. In some examples, aspects of the operations of 1615 may be performed by an uplink signaling manager 1140 as described with reference to FIG. 11.

The following provides an overview of aspects of the present disclosure:

Aspect 1: A method for wireless communications at a UE, comprising: transmitting capability information indicating transmission coherence information of the UE; receiving a downlink control information message comprising an index value associated with a transmission precoding matrix indicator of the plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information; and transmitting an uplink message based at least in part on the transmission precoding matrix indicator and according to the transmission coherence information.

Aspect 2: The method of aspect 1, wherein transmitting the capability information indicating the transmission coherence information comprises: transmitting, in the capability information, an indication of a threshold number of transmission layers supported by the UE for each antenna port at the UE, wherein the transmission precoding matrix indicator is associated with a transmission precoder matrix that satisfies the threshold number of transmission layers per antenna port.

Aspect 3: The method of any of aspects 1 through 2, wherein transmitting the capability information indicating the transmission coherence information comprises: transmitting an indication of a plurality of UE coherence values, each UE coherence value of the plurality of UE coherence values corresponding to a respective transmission rank.

Aspect 4: The method of any of aspects 1 through 3, further comprising: determining, for each of a plurality of transmission ranks, the capability information comprising a coherence capability associated with a first coherence type of a set of coherence types, the set of coherence types comprising a first coherence type indicating that the UE is not capable of maintaining phase coherence across any of the number of antenna ports, a second coherence type indicating that the UE is capable of maintaining phase coherence across up to two of the number of antenna ports, and a third coherence type indicating that the UE is capable of maintaining phase coherence across a total number of antenna ports at the UE.

Aspect 5: The method of aspect 4, wherein transmitting the capability information indicating the transmission coherence information comprises: transmitting, for each of the plurality of transmission ranks, an indication of one of the set of coherence types that indicates a coherence type that supports a phase coherence capability that is less than or equal to the coherence capability.

Aspect 6: The method of any of aspects 1 through 5, further comprising: precoding the uplink message according to a precoding configuration indicated by the transmission precoding matrix indicator, wherein the precoding configuration comprises a first precoder for a first number of antenna ports that is less than a total number of antenna ports supported by the UE and a second precoder for a second number of antenna ports that is less than the total number of antenna ports supported by the UE.

Aspect 7: The method of any of aspects 1 through 6, wherein transmitting the uplink message comprises: transmitting a first transport block of the uplink message according to a first modulation coding scheme; and transmitting a second transport block of the uplink message according to a second modulation coding scheme.

Aspect 8: The method of any of aspects 1 through 7, wherein the transmission precoding matrix indicator indicates a precoding codebook in which a first subset of a total number of antenna ports supported by the UE carrying a first set of transmission layers for the first transport block of the uplink message does not overlap with a second subset of the total number of antenna ports supported by the UE carrying a second set of transmission layers for the second transport block of the uplink message.

Aspect 9: The method of any of aspects 1 through 8, wherein the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

Aspect 10: A method for wireless communications at a network entity, comprising: obtaining capability information indicating transmission coherence information of the UE; outputting a downlink control information message comprising an index value associated with a transmission precoding matrix indicator of the plurality of transmission precoding matrix indicators, wherein each transmission precoding matrix indicator of the plurality of transmission precoding matrix indicators associated with a number of antenna ports and a number of transmission layers per antenna port at the UE, the transmission precoding matrix indicator satisfying the transmission coherence information; and obtaining an uplink message based at least in part on the transmission precoding matrix indicator and according to the transmission coherence information.

Aspect 11: The method of aspect 10, wherein obtaining the capability information indicating the transmission coherence information comprises: obtaining, in the capability information, an indication of a threshold number of transmission layers supported by the UE for each antenna port at the UE, wherein the transmission precoding matrix indicator is associated with a transmission precoder matrix that satisfies the threshold number of transmission layers per antenna port.

Aspect 12: The method of any of aspects 10 through 11, wherein obtaining the capability information indicating the transmission coherence information comprises: obtaining an indication of a plurality of UE coherence values, each UE coherence value of the plurality of UE coherence values corresponding to a respective transmission rank.

Aspect 13: The method of any of aspects 10 through 12, wherein obtaining the capability information indicating the transmission coherence information comprises: obtaining the uplink message according to a precoding configuration indicated by the transmission precoding matrix indicator, wherein the precoding configuration comprises a first precoder for a first number of antenna ports that is less than a total number of antenna ports supported by the UE and a second precoder for a second number of antenna ports that is less than the total number of antenna ports supported by the UE.

Aspect 14: The method of any of aspects 10 through 13, wherein obtaining a first transport block of the uplink message according to a first modulation coding scheme; and a second transport block of the uplink message according to a second modulation coding scheme.

Aspect 15: The method of any of aspects 10 through 14, wherein the transmission precoding matrix indicator indicates a precoding codebook in which a first subset of a total number of antenna ports supported by the UE carrying a first set of transmission layers for the first transport block of the uplink message does not overlap with a second subset of the total number of antenna ports supported by the UE carrying a second set of transmission layers.

Aspect 16: The method of any of aspects 10 through 15, wherein the transmission precoding matrix indicator indicates a precoding codebook in which a first subset of a total number of antenna ports supported by the UE carrying a first transport block of the uplink message does not overlap with a second subset of the total number of antenna ports supported by the UE carrying a second transport block of the uplink message.

Aspect 17: An apparatus for wireless communications at a UE, comprising a processor; memory coupled with the processor; and instructions stored in the memory and executable by the processor to cause the apparatus to perform a method of any of aspects 1 through 9.

Aspect 18: An apparatus for wireless communications at a UE, comprising at least one means for performing a method of any of aspects 1 through 9.

Aspect 19: A non-transitory computer-readable medium storing code for wireless communications at a UE, the code comprising instructions executable by a processor to perform a method of any of aspects 1 through 9.

Aspect 20: An apparatus for wireless communications at a network entity, comprising a processor; memory coupled with the processor; and instructions stored in the memory and executable by the processor to cause the apparatus to perform a method of any of aspects 10 through 16.

Aspect 21: An apparatus for wireless communications at a network entity, comprising at least one means for performing a method of any of aspects 10 through 16.

Aspect 22: A non-transitory computer-readable medium storing code for wireless communications at a network entity, the code comprising instructions executable by a processor to perform a method of any of aspects 10 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    a processor;
    memory coupled with the processor; and
    instructions stored in the memory and executable by the processor to cause the apparatus to:
        transmit capability information indicating transmission coherence information of the UE, the transmission coherence information associated with a capability of the UE to transmit multiple layers per antenna port at the UE;
        receive a downlink control information message comprising an index value associated with a transmission precoding matrix indicator of a plurality of transmission precoding matrix indicators, wherein each transmission precoding matrix indicator of the plurality of transmission precoding matrix indicators is associated with a quantity of antenna ports and a quantity of transmission layers per antenna port at the UE, the transmission precoding matrix indicator satisfying the transmission coherence information; and
        transmit an uplink message based at least in part on the transmission precoding matrix indicator and according to the transmission coherence information.

2. The apparatus of claim 1, wherein the instructions to transmit the capability information indicating the transmission coherence information are executable by the processor to cause the apparatus to:
    transmit, in the capability information, an indication of a threshold quantity of transmission layers supported by the UE for each antenna port at the UE, wherein the transmission precoding matrix indicator is associated with a transmission precoder matrix that satisfies the threshold quantity of transmission layers per antenna port.

3. The apparatus of claim 1, wherein the instructions to transmit the capability information indicating the transmission coherence information are executable by the processor to cause the apparatus to:
    transmit an indication of a plurality of UE coherence values, each UE coherence value of the plurality of UE coherence values corresponding to a respective transmission rank.

4. The apparatus of claim 1, wherein the instructions are further executable by the processor to cause the apparatus to:
    determine, for each of a plurality of transmission ranks, the capability information comprising a coherence capability associated with a first coherence type of a set of coherence types, the set of coherence types comprising a first coherence type indicating that the UE is not capable of maintaining phase coherence across any of the quantity of antenna ports, a second coherence type indicating that the UE is capable of maintaining phase coherence across up to two of the quantity of antenna ports, and a third coherence type indicating that the UE is capable of maintaining phase coherence across a total quantity of antenna ports at the UE.

5. The apparatus of claim 4, wherein the instructions to transmit the capability information indicating the transmission coherence information are executable by the processor to cause the apparatus to:
    transmit, for each of the plurality of transmission ranks, an indication of one of the set of coherence types that indicates a coherence type that supports a phase coherence capability that is less than or equal to the coherence capability.

6. The apparatus of claim 1, wherein the instructions are further executable by the processor to cause the apparatus to:
    precode the uplink message according to a precoding configuration indicated by the transmission precoding matrix indicator, wherein the precoding configuration comprises a first precoder for a first quantity of antenna ports that is less than a total quantity of antenna ports supported by the UE and a second precoder for a second quantity of antenna ports that is less than the total quantity of antenna ports supported by the UE.

7. The apparatus of claim 1, wherein the instructions to transmit the uplink message are executable by the processor to cause the apparatus to:
    transmit a first transport block of the uplink message according to a first modulation coding scheme; and
    transmit a second transport block of the uplink message according to a second modulation coding scheme.

8. The apparatus of claim 1, wherein the transmission precoding matrix indicator indicates a precoding codebook in which a first subset of a total quantity of antenna ports supported by the UE carrying a first set of transmission layers does not overlap with a second subset of the total quantity of antenna ports supported by the UE carrying a second set of transmission layers.

9. The apparatus of claim 1, wherein the transmission precoding matrix indicator indicates a precoding codebook in which a first subset of a total quantity of antenna ports supported by the UE carrying a first transport block of the uplink message does not overlap with a second subset of the total quantity of antenna ports supported by the UE carrying a second transport block of the uplink message.

10. An apparatus for wireless communications at a network entity, comprising:
   a processor;
   memory coupled with the processor; and
   instructions stored in the memory and executable by the processor to cause the apparatus to:
      obtain capability information indicating transmission coherence information of a user equipment (UE), the transmission coherence information associated with a capability of the UE to transmit multiple layers per antenna port at the UE;
      output a downlink control information message comprising an index value associated with a transmission precoding matrix indicator of a plurality of transmission precoding matrix indicators, wherein each transmission precoding matrix indicator of the plurality of transmission precoding matrix indicators is associated with a quantity of antenna ports and a quantity of transmission layers per antenna port at the UE, the transmission precoding matrix indicator satisfying the transmission coherence information; and
      obtain an uplink message based at least in part on the transmission precoding matrix indicator and according to the transmission coherence information.

11. The apparatus of claim 10, wherein the instructions to obtain the capability information indicating the transmission coherence information are executable by the processor to cause the apparatus to:
   obtain, in the capability information, an indication of a threshold quantity of transmission layers supported by the UE for each antenna port at the UE, wherein the transmission precoding matrix indicator is associated with a transmission precoder matrix that satisfies the threshold quantity of transmission layers per antenna port.

12. The apparatus of claim 10, wherein the instructions to obtain the capability information indicating the transmission coherence information are executable by the processor to cause the apparatus to:
   obtain an indication of a plurality of UE coherence values, each UE coherence value of the plurality of UE coherence values corresponding to a respective transmission rank.

13. The apparatus of claim 10, wherein the instructions to obtain the uplink message are executable by the processor to cause the apparatus to:
   obtain the uplink message according to a precoding configuration indicated by the transmission precoding matrix indicator, wherein the precoding configuration comprises a first precoder for a first quantity of antenna ports that is less than a total quantity of antenna ports supported by the UE and a second precoder for a second quantity of antenna ports that is less than the total quantity of antenna ports supported by the UE.

14. The apparatus of claim 10, wherein the instructions to obtain the uplink message are executable by the processor to cause the apparatus to:
   obtain a first transport block of the uplink message according to a first modulation coding scheme; and
   obtain a second transport block of the uplink message according to a second modulation coding scheme.

15. The apparatus of claim 10, wherein the transmission precoding matrix indicator indicates a precoding codebook in which a first subset of a total quantity of antenna ports supported by the UE carrying a first set of transmission layers for a first transport block of the uplink message does not overlap with a second subset of the total quantity of antenna ports supported by the UE carrying a second set of transmission layers.

16. The apparatus of claim 10, wherein the transmission precoding matrix indicator indicates a precoding codebook in which a first subset of a total quantity of antenna ports supported by the UE carrying a first transport block of the uplink message does not overlap with a second subset of the total quantity of antenna ports supported by the UE carrying a second transport block of the uplink message.

17. A method for wireless communications at a user equipment (UE), comprising:
   transmitting capability information indicating transmission coherence information of the UE, the transmission coherence information associated with a capability of the UE to transmit multiple layers per antenna port at the UE;
   receiving a downlink control information message comprising an index value associated with a transmission precoding matrix indicator of a plurality of transmission precoding matrix indicators, wherein each transmission precoding matrix indicator of the plurality of transmission precoding matrix indicators is associated with a quantity of antenna ports and a quantity of transmission layers per antenna port at the UE, the transmission precoding matrix indicator satisfying the transmission coherence information; and
   transmitting an uplink message based at least in part on the transmission precoding matrix indicator and according to the transmission coherence information.

18. The method of claim 17, wherein transmitting the capability information indicating the transmission coherence information comprises:
   transmitting, in the capability information, an indication of a threshold quantity of transmission layers supported by the UE for each antenna port at the UE, wherein the transmission precoding matrix indicator is associated with a transmission precoder matrix that satisfies the threshold quantity of transmission layers per antenna port.

19. The method of claim 17, wherein transmitting the capability information indicating the transmission coherence information comprises:
   transmitting an indication of a plurality of UE coherence values, each UE coherence value of the plurality of UE coherence values corresponding to a respective transmission rank.

20. The method of claim 17, further comprising:
   determining, for each of a plurality of transmission ranks, the capability information comprising a coherence capability associated with a first coherence type of a set of coherence types, the set of coherence types comprising a first coherence type indicating that the UE is not capable of maintaining phase coherence across any of the quantity of antenna ports, a second coherence type indicating that the UE is capable of maintaining phase coherence across up to two of the quantity of antenna ports, and a third coherence type indicating that the UE is capable of maintaining phase coherence across a total quantity of antenna ports at the UE.

21. The method of claim 20, wherein transmitting the capability information indicating the transmission coherence information comprises:
transmitting, for each of the plurality of transmission ranks, an indication of one of the set of coherence types that indicates a coherence type that supports a phase coherence capability that is less than or equal to the coherence capability.

22. The method of claim 17, further comprising:
precoding the uplink message according to a precoding configuration indicated by the transmission precoding matrix indicator, wherein the precoding configuration comprises a first precoder for a first quantity of antenna ports that is less than a total quantity of antenna ports supported by the UE and a second precoder for a second quantity of antenna ports that is less than the total quantity of antenna ports supported by the UE.

23. The method of claim 17, wherein transmitting the uplink message comprises:
transmitting a first transport block of the uplink message according to a first modulation coding scheme; and
transmitting a second transport block of the uplink message according to a second modulation coding scheme.

24. The method of claim 17, wherein the transmission precoding matrix indicator indicates a precoding codebook in which a first subset of a total quantity of antenna ports supported by the UE carrying a first set of transmission layers for a first transport block of the uplink message does not overlap with a second subset of the total quantity of antenna ports supported by the UE carrying a second set of transmission layers for the second transport block of the uplink message.

25. The method of claim 17, wherein the transmission precoding matrix indicator indicates a precoding codebook in which a first subset of a total quantity of antenna ports supported by the UE carrying a first transport block of the uplink message does not overlap with a second subset of the total quantity of antenna ports supported by the UE carrying a second transport block of the uplink message.

26. A method for wireless communications at a network entity, comprising:
obtaining capability information indicating transmission coherence information of a user equipment (UE), the transmission coherence information associated with a capability of the UE to transmit multiple layers per antenna port at the UE;
outputting a downlink control information message comprising an index value associated with a transmission precoding matrix indicator of a plurality of transmission precoding matrix indicators, wherein each transmission precoding matrix indicator of the plurality of transmission precoding matrix indicators is associated with a quantity of antenna ports and a quantity of transmission layers per antenna port at the UE, the transmission precoding matrix indicator satisfying the transmission coherence information; and
obtaining an uplink message based at least in part on the transmission precoding matrix indicator and according to the transmission coherence information.

27. The method of claim 26, wherein obtaining the capability information indicating the transmission coherence information comprises:
obtaining, in the capability information, an indication of a threshold quantity of transmission layers supported by the UE for each antenna port at the UE, wherein the transmission precoding matrix indicator is associated with a transmission precoder matrix that satisfies the threshold quantity of transmission layers per antenna port.

28. The method of claim 26, wherein obtaining the capability information indicating the transmission coherence information comprises:
obtaining, in the capability information, an indication of a threshold quantity of transmission layers supported by the UE for each antenna port at the UE, wherein the transmission precoding matrix indicator is associated with a transmission precoder matrix that satisfies the threshold quantity of transmission layers per antenna port.

29. The method of claim 26, wherein obtaining the capability information indicating the transmission coherence information comprises:
obtaining an indication of a plurality of UE coherence values, each UE coherence value of the plurality of UE coherence values corresponding to a respective transmission rank.

30. The method of claim 26, wherein obtaining the capability information indicating the transmission coherence information comprises:
obtaining the uplink message according to a precoding configuration indicated by the transmission precoding matrix indicator, wherein the precoding configuration comprises a first precoder for a first quantity of antenna ports that is less than a total quantity of antenna ports supported by the UE and a second precoder for a second quantity of antenna ports that is less than the total quantity of antenna ports supported by the UE.

* * * * *